US012401672B2

United States Patent
Thorve et al.

(10) Patent No.: US 12,401,672 B2
(45) Date of Patent: Aug. 26, 2025

(54) FINDING ANOMALOUS PATTERNS

(71) Applicant: NVIDIA Corporation, Santa Clara, CA (US)

(72) Inventors: Ajay Anil Thorve, Maple Valley, WA (US); Allan Enemark, Santa Cruz, CA (US); Rachel Allen, Arlington, VA (US); Bartley Richardson, Alexandria, VA (US)

(73) Assignee: NVIDIA Corporation, Santa Clara, CA (US)

( * ) Notice: Subject to any disclaimer, the term of this patent is extended or adjusted under 35 U.S.C. 154(b) by 169 days.

(21) Appl. No.: 18/235,203

(22) Filed: Aug. 17, 2023

(65) Prior Publication Data

US 2024/0106848 A1    Mar. 28, 2024

Related U.S. Application Data

(60) Provisional application No. 63/407,424, filed on Sep. 16, 2022.

(51) Int. Cl.
*H04L 9/40* (2022.01)
*G06F 3/04845* (2022.01)
(Continued)

(52) U.S. Cl.
CPC ...... *H04L 63/1425* (2013.01); *G06F 3/04845* (2013.01); *H04L 43/08* (2013.01);
(Continued)

(58) Field of Classification Search
CPC .. G06F 16/2365; H04L 65/1104; H04L 43/08; H04L 63/1416
See application file for complete search history.

(56) References Cited

U.S. PATENT DOCUMENTS 6,453,318 B1 * 9/2002 Shiina ................. G06F 16/2365
                                              707/999.102
11,930,039 B1 * 3/2024 Geethakumar ..... H04L 63/1416
(Continued)

OTHER PUBLICATIONS

Nv-morpheus / morpheus-visualizations, https://github.com/nv-morpheus/morpheus-visualizations, retrieved on August. 17, 2023.
(Continued)

*Primary Examiner* — Barbara B Anyan
(74) *Attorney, Agent, or Firm* — Lowenstein Sandler LLP

(57) ABSTRACT

Technologies for generating a graphical user interface (GUI) dashboard with a three-dimensional (3D) grid of unit cells are described. An anomaly statistic can be determined for a set of records. A subset of network address identifiers can be identified and sorted according to the anomaly statistic. The subset can have higher anomaly statistics than other network address identifiers. There can be a maximum number in the subset. The GUI dashboard is generated with unit cells organized by the subset of network address identifiers as rows, time intervals as columns, colors as a configurable anomaly score indicator, and a number of network access events as column heights. Each unit cell is a colored, 3D visual object representing a composite score of anomaly scores associated with zero or more network access events corresponding to the respective network address identifier at the respective time interval. The GUI dashboard is rendered on a display.

22 Claims, 25 Drawing Sheets

(51) Int. Cl.
*H04L 43/08* (2022.01)
*H04L 65/1104* (2022.01)
*G06F 16/23* (2019.01)

(52) U.S. Cl.
CPC ........ *H04L 63/102* (2013.01); *H04L 65/1104* (2022.05); *G06F 16/2365* (2019.01); *G06F 2203/04806* (2013.01)

(56) References Cited

U.S. PATENT DOCUMENTS

| | | |
|---|---|---|
| 2017/0063897 A1 | 3/2017 | Muddu et al. |
| 2017/0063902 A1 | 3/2017 | Muddu et al. |
| 2017/0353477 A1 | 12/2017 | Faigon et al. |
| 2018/0288126 A1* | 10/2018 | Smart ..................... H04L 43/08 |
| 2019/0260785 A1 | 8/2019 | Jenkinson et al. |
| 2021/0049270 A1 | 2/2021 | Urmanov et al. |
| 2021/0184917 A1* | 6/2021 | Bharrat ............... H04L 65/1104 |

OTHER PUBLICATIONS

Extended European Search Report for European Application No. 23197316.5, mailed Feb. 14, 2024, 12 Pages.
Extended European Search Report for European Application No. 23197488.2, mailed Feb. 14, 2024, 10 Pages.

* cited by examiner

FINDING ANOMALOUS PATTERNS

RELATED APPLICATIONS

This application claims the benefit of U.S. Provisional Application No. 63/407,424, filed Sep. 16, 2022, the entire contents of which are incorporated herein by reference. This application is related to U.S. patent application Ser. No. 18/235,213, entitled "GENERATING MODELS FOR DETECTION OF ANOMALOUS PATTERNS," filed concurrently with the present application.

BACKGROUND

Cybersecurity refers to the practice of protecting computer systems, networks, software, and data from digital threats and unauthorized access. It involves implementing measures and technologies to prevent, detect, and respond to cyberattacks, data breaches, and other malicious activities. The primary goal of cybersecurity is to ensure the confidentiality, integrity, and availability of information and resources in cyberspace. It encompasses a wide range of practices, processes, and technologies that work together to safeguard digital assets from various threats, including hackers, malware, viruses, phishing attacks, ransomware, and more.

Traditional user behavior analysis (UBA) uses generalized organizational rules to identify patterns by users that are explicitly bad according to the generalized organizational rules. For example, a singular model can be trained to identify these patterns. However, there are deviations in some patterns that would be categorized as "typical enterprise behavior," yet are still bad behavior. It is difficult to deeply analyze every account login or application activity across an enterprise network, especially for enterprises with hundreds to thousands of users. It is difficult to rapidly identify critical behavior anomalies for security analysts so they can quickly discover and react to threats.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
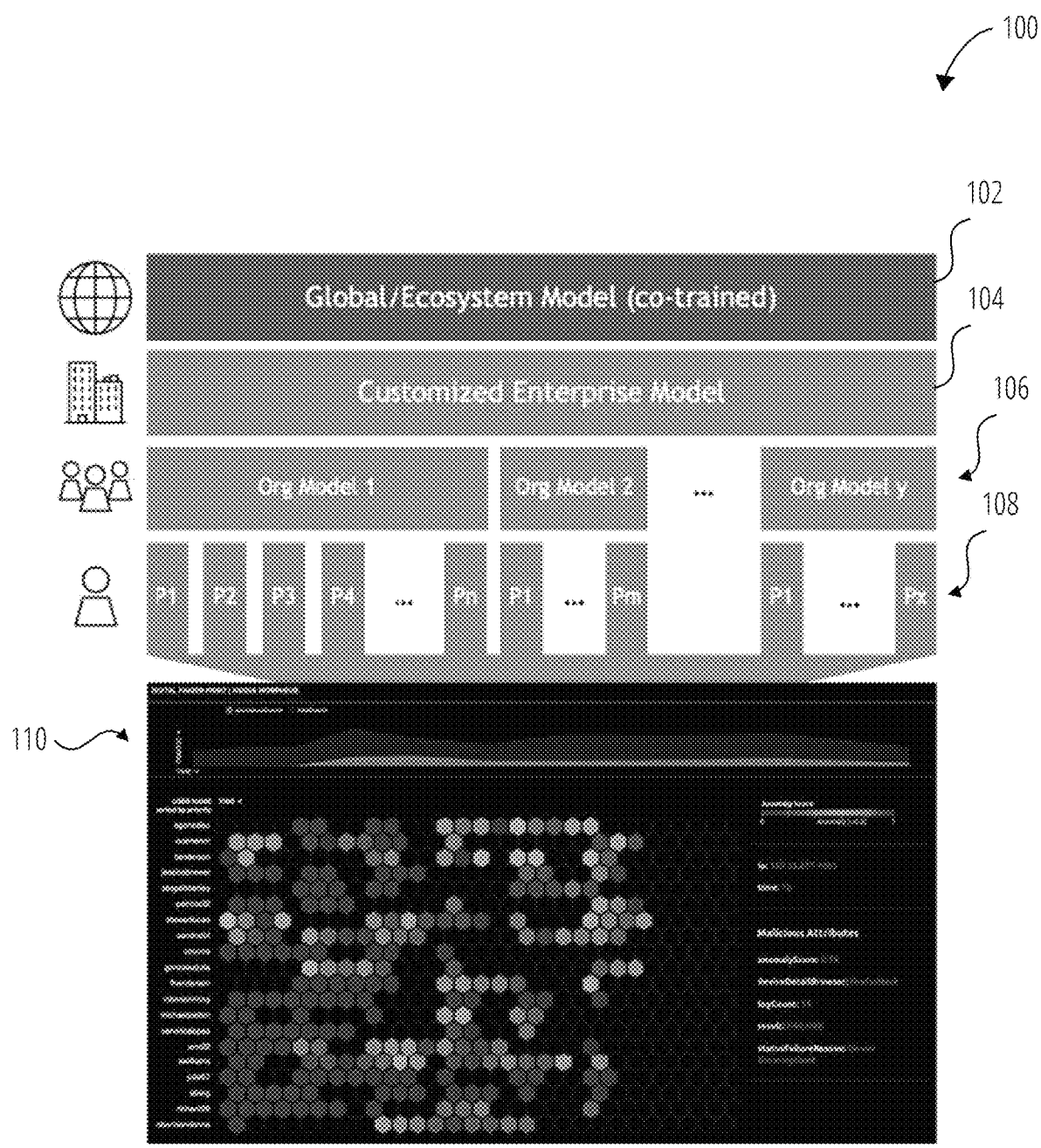
FIG. 1 illustrates an overall structure of a digital fingerprinting (DFP) system with multiple DFP models for an enterprise network according to at least one embodiment.

Technologies for generating a set of models for each account, where each model is a fine-grained, unsupervised behavior model trained for each user to monitor and detect anomalous patterns are described. As described above, generalized organizational rules used to identify explicitly bad patterns are inadequate, and it is difficult to analyze every account's behavior across an enterprise network, especially for enterprises with hundreds to thousands of users. It is also difficult to rapidly identify critical behavior anomalies for security analysts so they can quickly discover and react to threats.

Aspects and embodiments of the present disclosure overcome the deficiencies described above and others by providing a digital fingerprinting (DFP) workflow for cybersecurity, enabling organizations to deeply analyze every account login across the network. Digital fingerprinting (DFP) is a suite of techniques, models, and pipelines that enable early alerting on anti-pattern activity. Every account (user/machine/service/asset) can have a digital fingerprint, which is a typical set of actions the account does or does not do over a given period of time. Understanding every account's day-to-day, moment-by-moment activity helps identify anomalous behavior and uncover potential threats in the environment. This type of activity may not be malicious. Rather, it is simply anti-pattern to how an individual, machine, asset, and/or service, typically acts. For example, the first series of actions that occur after a compromise are usually discovery or information gathering tactics. The attacker is searching through corporate assets and tools (e.g., Confluence, Git, Jira, employee directories) to learn the enterprise environment and determine where the most valuable assets are and how to ensure continued access. These actions are not malicious when viewed from the enterprise level. These actions can occur every day. However, when a compromised user credential is used to perform these actions, this behavior represents a dramatic shift from how this user typically moves through the network. These anti-pattern behaviors are important to identify and quickly triage.

The DFP workflow, also referred to as a DFP reference workflow or a DFP workflow with a reference architecture, can use artificial intelligence (AI) and machine learning (ML) to perform massive data filtration and reduction for real-time threat detection by identifying user-specific anti-patterns in behavior rather than generalized organizational rules. The DFP workflow can be a pre-built, end-to-end workflow with a set of pre-built scripts and tunable parameters. The tunable parameters are parameters that can be adjusted to customize the DFP workflow and improve the performance or efficiency of the application framework. An application developer can set the tunable parameters, or they can be automatically tuned by the framework itself. The optimal values for tunable parameters vary depending on the specific application framework and the environment in which it is used. It is important to experiment with different values to find the optimal values for a specific application. In at least one embodiment, the DFP workflow can include a first set of tunable parameters associated with an unsupervised training pipeline, a second set of tunable parameters associated with an inference pipeline, and a shared model store. The DFP workflow can be used to generate a collection of models at various granularities that can be used, including a model per enterprise (organization=generic), a model per hierarchy leader (organization=group), and a model per account (account=employee/user). As described herein, the DFP workflow can be used to generate fine-grained, unsupervised behavior models trained for each account to monitor their behavior. Security analysts can rapidly identify critical behavior anomalies so that they can more quickly discover and react to threats. Alerts can be triggered when deviations from normality occur for any user. The models can be continuously updated and retained over time.

Creating this type of DFP workflow requires multiple integrations into existing infrastructure. The DFP workflow can generate and/or use a reference architecture and tunable parameters to deploy DFP and DFP-like systems on any enterprise architecture. The DFP workflow and reference architecture can provide a template (including integration with any third-party software) that can be used to deploy DFP to any environment. A system administrator can customize the template(s) for a particular enterprise. The DFP workflow and reference architecture include pre-built scripts, charts, and tunable parameters that enable flexible deployment in a variety of enterprise environments without the need to modify the core DFP code and core DFP functionality. From a data science perspective, it includes tunable parameters to ensure flexible alerting as well as flexibility in the "explainability" of the anomalous patterns being detected. Explainability (also referred to as "interpretability") is the concept that a machine learning model and its output can be explained in a way that "makes sense" to a human at an acceptable level including identifying the individual features of the user's activity that cause the anomalous behavior alert.

Aspects and embodiments of the present disclosure can be anchored on pattern versus anti-pattern detection. Aspects and embodiments of the present disclosure of DFP workflow and reference architecture differ from traditional UBA in that it is not looking for patterns that are explicitly "bad," rather it is looking for when individual user/machine/service patterns deviate from expected behavior of the individual or group (even if the deviation would typically be categorized as "typical enterprise behavior"). To this end, it may be necessary to deploy and manage thousands of individually trained models, as compared to a singular model in traditional UBA approaches. This requires robust pipelines as represented in the embodiments of the DFP reference workflow described herein.

Aspects and embodiments of the present disclosure can use a DFP pipeline to ingest various data sources for behavioral anomaly detection. The various data sources can include Azure Active Directory (AD) logs, DUO authentication logs, windows event logs, or the like. To apply DFP to a new data store, a process of feature selection can be performed. Any data source can be fed into the DFP pipeline after some preprocessing to get a feature vector per log/data point. The DFP pipeline can support various types of features, including numerical features, categorical features, and/or binary features. The numerical features can include continuous or discrete quantitative attributes representing measurements or counts. Numerical features can be derived from other features through feature engineering techniques, which involve creating new variables or transforming existing ones to enhance model performance and uncover hidden patterns within the data, for example, a log count, a location increment, an increment of unique applications accessed in a period (e.g., day), time of day, failure attempts, or the like. A numerical feature can be any derived or extracted feature that is a number or can be converted to a number. Different numerical features are defined and used for each log type. Binary features can be true/false, or 1 or 0 types of data. Categorical features can be distinct, non-continuous attributes that distinguish data points. For example, an application display name, a client application type, a username, a browser type, an operating system type, a result, a status failure reason, a risk event type, an IP address, parsed subnet feature of IP address, a location, a phone number, or the like. A categorical feature can be any item that is converted into a string. The "categories" are determined by finding unique strings in the input dataset. For example, the browser type category could be determined by taking logs, finding the set of unique browser names, and then assigning a category identifier to each unique browser name. The DFP pipeline can build a targeted model for each account (entities like a user, a service, a machine, or the like). The chosen data source should have a field that uniquely identifies the entity being modeled, such as a user identifier, an account identifier, or other types of identifiers.

At its core, DFP is a collection of unsupervised ML models that are trained at various granularities on heterogeneous networks and application logs. DFP aims to produce a large collection of small models that specifically target a unique individual, machine, service, and other such corporate assets. Additionally, the DFP can create aggregate models at larger granularities to address (a) a cold start problem and (b) help reduce false positives. The DFP can quickly train and update these models to adapt to changes in the enterprise environment and incorporate intelligent thresholding and "explainability" metrics to reduce the load on the cybersecurity analyst/operator and aggressively limit the number of alerts produced per day. The overall structure of the DFP models is shown and described below with respect to FIG. 1.

FIG. 1 illustrates an overall structure of a DFP system 100 with multiple DFP models for an enterprise network according to at least one embodiment. The DFP system 100 includes a collection of unsupervised ML models trained at various granularities. As illustrated, the DFP system 100 includes a global model (also referred to as an ecosystem model) that is co-trained for multiple enterprises. The DFP system 100 includes an enterprise model 104 trained at an enterprise level. The DFP system 100 includes one or more organization models 106 trained at an organization model (e.g., such as a group of accounts within an organization, such as accounting, engineering, sales, or the like, within an organization). The DFP system 100 includes multiple user models 108 trained at an account level. The user models 108 can be trained for a single account or a group of accounts, the group of accounts not necessarily being associated with an organization model 106 that is trained at the organization level. The collection of unsupervised ML models can be trained at various granularities on heterogeneous network and application logs. The user models 108 of the DFP system 100 can be a large collection of models specifically targeting a unique individual, machine, service, and other such corporate assets. In addition to the user models 108, the DFP system 100 can generate and use aggregate models at larger granularities, such as at the organization level or enterprise level, to address (a) a cold start problem and (b) help reduce false positives. The DFP system 100 can quickly train and update these models to adapt to changes in the enterprise environment and incorporate intelligent thresholding and "explainability" metrics to reduce the load on the cybersecurity analyst/operator and aggressively limit the number of alerts produced per day. FIG. 1 also illustrates a graphical user interface (GUI) dashboard 110 with intelligent thresholding and "explainability" metrics for visualization of results from the DFP system 100. Additional details of the visualization technologies for finding anomalous patterns are described in more detail below with respect to FIG. 21 to FIG. 23.

As described herein, a DFP workflow can be used by cybersecurity developers to create optimized ML pipelines for filtering, processing, and classifying large volumes of real-time data to flag when account activity patterns shift. The DFP workflow can be used to generate a DFP training pipeline and a DFP inference pipeline, as described below with respect to FIG. 2 and FIG. 3, respectively. These pipelines can be implemented using various cloud-native services of a container orchestration platform. The cloud-native services can be cloud-native Kubernetes services, such as Kafka, MLflow, Prometheus, Elasticsearch, Kibana, Grafana, S3 Compatible Object Storage, or the like. Alternatively, other types of services can be used to facilitate different aspects of the DFP workflow. It should be noted that these technologies are not hard requirements. The DFP workflow can be integrated with these technologies but can also be built to integrate with other technologies. For example, several platforms and frameworks similar to MLflow can provide capabilities for managing and operationalizing the machine learning lifecycle.

As described above, the DFP workflow can include a DFP training pipeline architecture and a DFP inference pipeline architecture, as described below with respect to FIG. 2 and FIG. 3, respectively.

Figure 2:
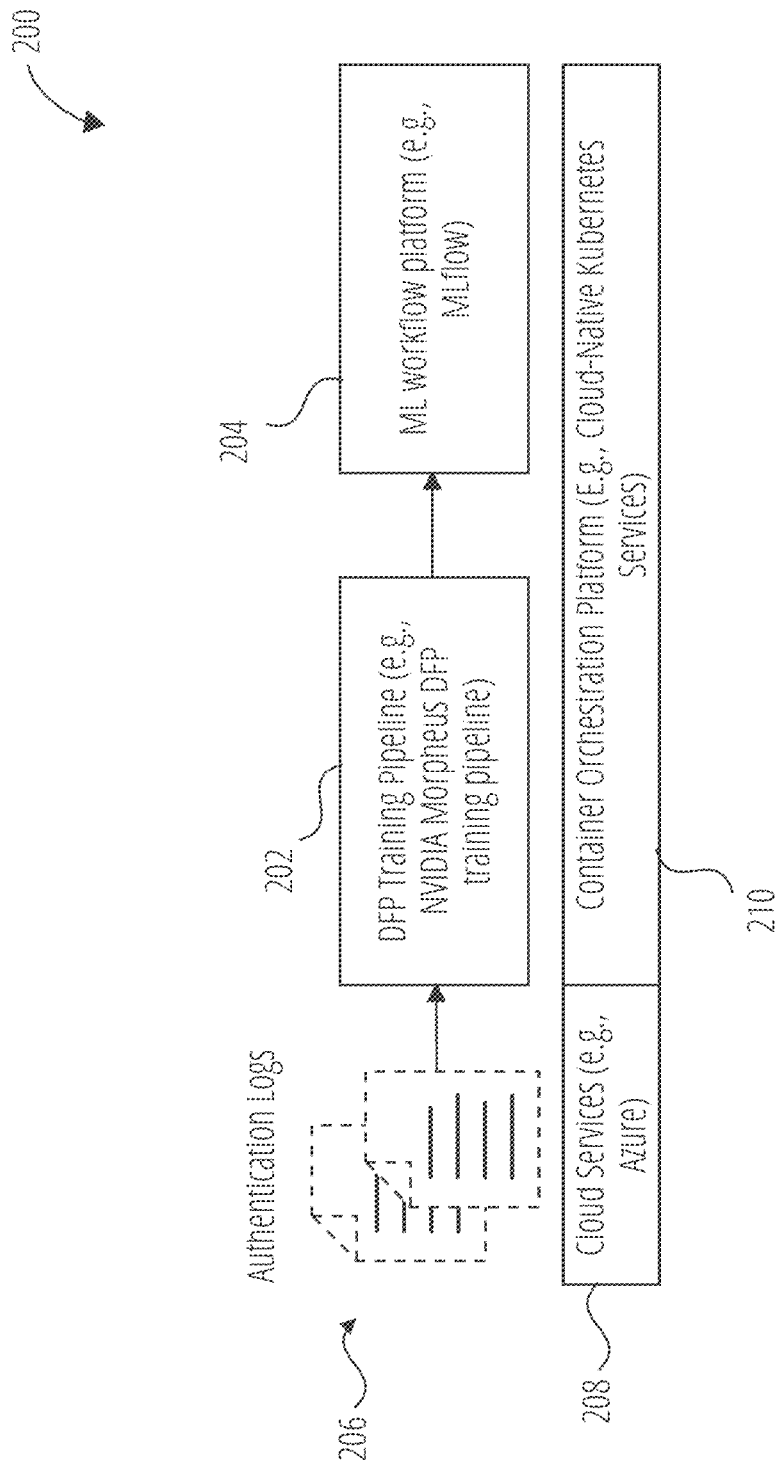
FIG. 2 is a block diagram of a digital fingerprinting (DFP) training pipeline according to at least one embodiment.

FIG. 2 is a block diagram of a DFP training pipeline architecture 200 according to at least one embodiment. The DFP training pipeline architecture 200 can include a DFP training pipeline 202 and an ML workflow platform 204 executing on a container orchestration platform 210. The container orchestration platform 210 can collect authentication logs 206 from one or more cloud services 208 (e.g., Azure Active Directory (AD) logs). Azure AD is a cloud-based identity and access management service that provides authentication and authorization for applications and services. Alternatively, other identity and access management services can be used to collect and record authentication logs 206.

The DFP training pipeline 202 can process the authentication logs 206 to generate feature data and train one or more user models using an ML workflow platform 204. The ML workflow platform 204 can use a reference architecture or template for the DFP training pipeline 202, the DFP training pipeline 202 having variable tunable parameters. The ML workflow platform 204 can use MLflow technology. MLflow is an open-source platform designed to manage and streamline the machine learning lifecycle. It provides a comprehensive set of tools and functionalities to help data scientists and machine learning engineers track experiments, reproduce models, deploy them into production, and collaborate effectively. The MLflow can be used to allow operators or administrators to log and track experiments during the model development process, capturing parameters, metrics, and artifacts. MLflow can provide a standardized format for packaging and sharing ML code and dependencies, a way to package and deploy ML models to different serving platforms, such as TensorFlow Serving, PyTorch, or other inference servers. The ML flow can provide a model registry, such as described below, with respect to FIG. 4. MLflow can provide tools and integrations to deploy and server ML models in production, including Kubernetes, Azure ML, AWS SageMaker, etc. Overall, MLflow aims to simplify the end-to-end machine learning lifecycle, from experimentation and development to model deployment and management. It promotes reproducibility, collaboration, and scalability, making it easier for data scientists and engineers to build, deploy, and monitor machine learning models in production environments. In other embodiments, other ML workflow platform technologies can be used, such as Kubeflow, TensorFlow Extended (TFX), H20.ai, DataRobot, Databricks, Seldon, Cortex, or the like. These platforms, including MLflow, offer various features and integrations to support the end-to-end machine learning lifecycle, from data preprocessing to model deployment and monitoring. The choice of platform depends on specific requirements, infrastructure preferences, and the tools and frameworks being used in the machine learning workflows.

Figure 3:
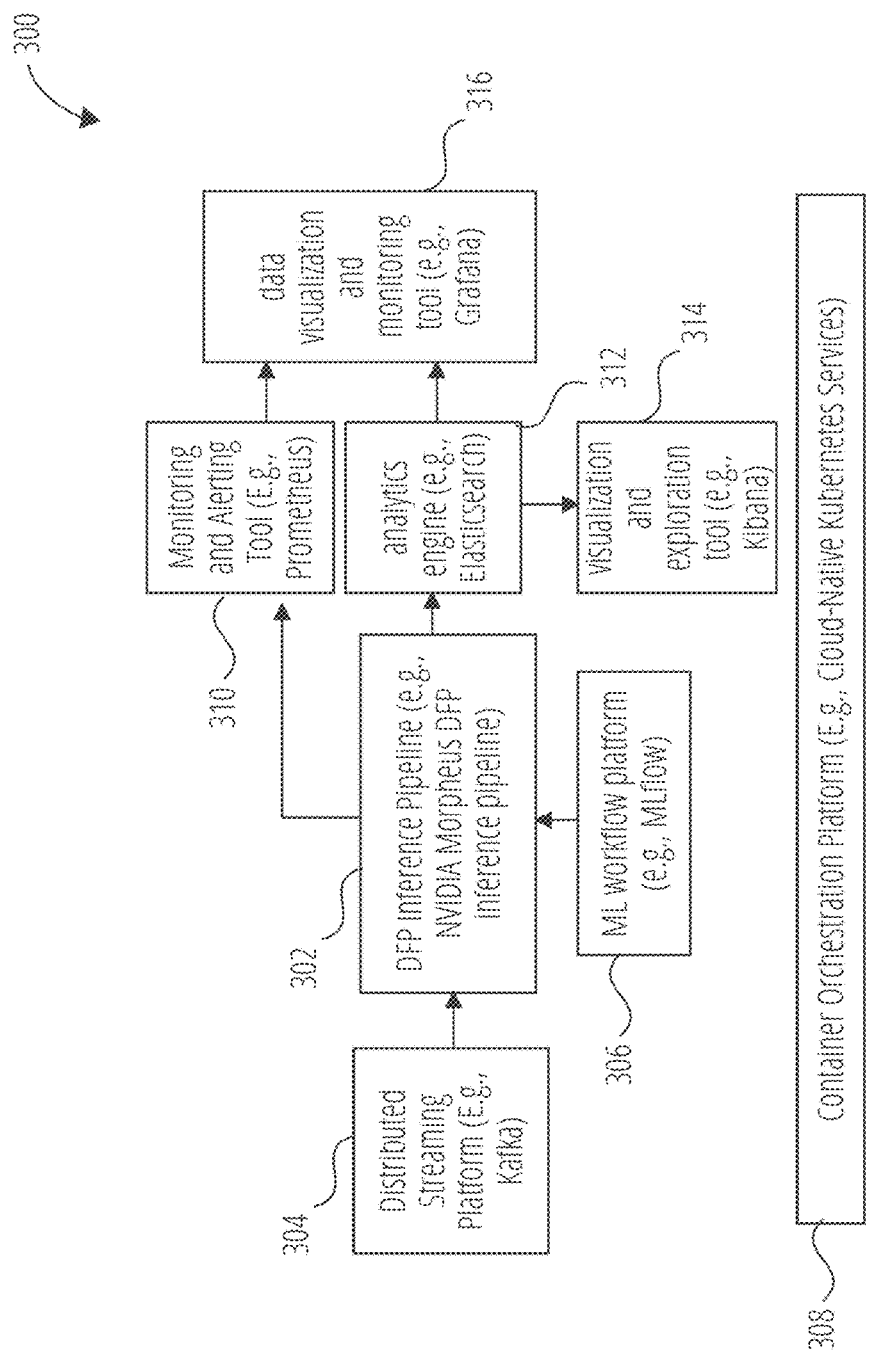
FIG. 3 is a block diagram of a DFP inference pipeline according to at least one embodiment.

FIG. 3 is a block diagram of a DFP inference pipeline architecture according to at least one embodiment. The DFP inference pipeline architecture 300 can include a DFP inference pipeline 302 and an ML workflow platform 306 executing on a container orchestration platform 308. The container orchestration platform 308 can deploy the DFP inference pipeline 302 and configure the DFP inference pipeline 302 to receive input data (e.g., real-time data) from a distributed streaming platform 304 (e.g., Kafka). Kafka is an open-source distributed streaming platform developed by the Apache Software Foundation. It is designed to handle high-throughput, fault-tolerant, and scalable real-time data streaming and processing. Kafka acts as a distributed messaging system that allows the publishing and subscribing of streams of records or messages. Kafka Streams is a feature of Kafka that allows the building of real-time stream processing applications. It enables processing and transforming data streams within Kafka, enabling real-time analytics, data integration, and event-driven applications.

The DFP inference pipeline 302 can process real-time data from the distributed streaming platform 304 to generate feature data and classify the real-time data using one or more user models trained to detect anomalous patterns, as described in more detail below. The ML workflow platform 306 can use a reference architecture or template for the DFP inference pipeline 302, the DFP inference pipeline 302 having variable tunable parameters. The ML workflow platform 306 can use the MLflow technology. Alternatively, other ML workflow platform technologies can be used. The DFP inference pipeline 302 can generate output data that can be provided to a monitoring and alerting tool 310 and an analytics engine 312. The monitoring and alerting tool 310 can use the Prometheus technology. Prometheus is an open-source monitoring and alerting tool. It collects metrics from the DFP inference pipeline 302 using a pull model. Prometheus stores the collected metrics in a time-series database, allowing users to query and visualize the data. It provides powerful querying capabilities, flexible alerting, and integrations with other tools in the monitoring ecosystem. The analytics engine 312 can use the Elasticsearch technology. Elasticsearch is a distributed, scalable, and highly available search and analytics engine. It is designed to handle large volumes of structured and unstructured data, including log data. Elasticsearch allows users to store, index, search, and analyze data in near real-time. It provides full-text search, aggregations, and advanced querying capabilities, making it an excellent choice for log management and search use cases.

The monitoring and alerting tool 310 and analytics engine 312 can provide output data to a data visualization and monitoring tool 316. The data visualization and monitoring tool 316 can use the Grafana technology. Grafana is an open-source data visualization and monitoring tool. It offers a unified dashboarding and visualization platform for metrics, logs, and other data sources. Grafana supports multiple data sources, including Prometheus and Elasticsearch, allowing users to create visually appealing dashboards with real-time data. It provides a wide range of panels, alerting features, and extensibility options, making it popular for monitoring and observability needs. The analytics engine 312 can also output data to a visualization and exploration tool 314. The visualization and exploration tool 314 can use the Kibana technology. Kibana is an open-source data visualization and exploration tool primarily used for log analysis. It works in conjunction with Elasticsearch, a distributed search and analytics engine. Kibana allows users to explore, analyze, and visualize log data in real time, create dashboards, and perform ad-hoc searches and queries. It provides powerful search capabilities, visualization options, and interactive dashboards for log analysis and monitoring. Although Prometheus, Elasticsearch, Kibana, and Grafana can be used for the various processing blocks, other similar technologies can be used for the different processing blocks.

In at, the ML workflow platform 306 can provide a model registry, such as described below with respect to FIG. 4.

Figure 4:
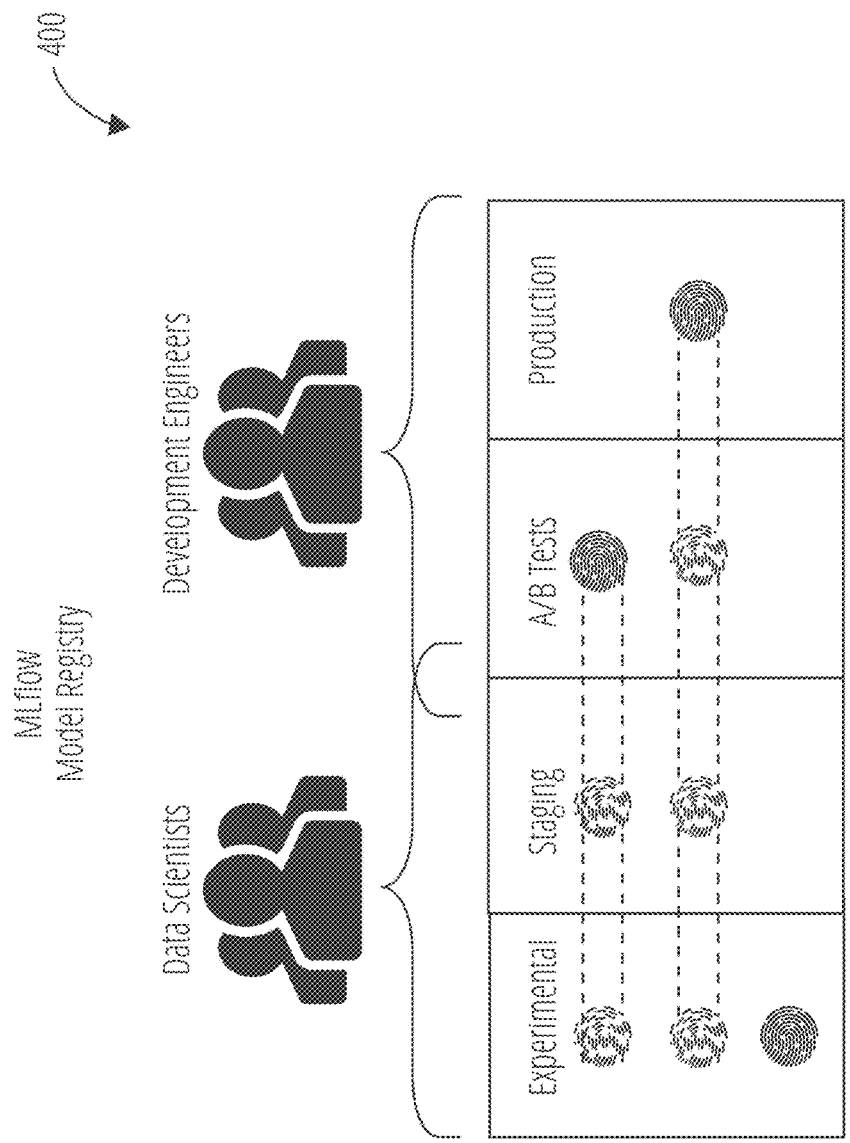
FIG. 4 illustrates a model registry for managing and versioning machine learning models throughout their lifecycle according to at least one embodiment.

FIG. 4 illustrates a model registry 400 for managing and versioning machine learning models throughout their lifecycle according to at least one embodiment. The model registry 400 can be an MLflow Model Registry developed by Databricks. The model registry 400 can enable collaboration and versioning of models. The model registry 400 can be a centralized repository where models can be stored, shared, and managed throughout their lifecycle. It supports model versioning, stage transitions, and approval workflows. The ML workflow platform (e.g., 204 or 306) can be a key element to both the training and inferencing pipelines. The ML workflow platform enables organizations to easily manage their end-to-end machine learning models' lifecycle. The model registry 400 can be a centralized model store with its own set of application programming interfaces (APIs) and user interface for manageability. In this workflow, a tracking database can be backed by a PostgreSQL database, and the model repository can be backed by an S3-compatible Minio object storage. Apache Kafka is the open-source streaming platform that brings real-time data into the Digital Fingerprinting Inferencing pipeline. Both Kafka and MLflow are commonly used platforms within the Developer industry.

In at least one embodiment, the DFP reference workflow can include a Kafka producer with a sample dataset and a web server, as well as Python code and a custom debugger to allow the developer to debug anywhere within the pipeline. Options are available for developing and running the pipelines in the cloud or on-premise. Additional technologies used within the Morpheus pipeline are described in more detail below.

In at least one embodiment, a computing system includes one or more memory devices to store instructions of an application framework with a DFP workflow including a reference architecture, including an unsupervised training pipeline and an inference pipeline. An application framework is a software framework used by software developers to implement the standard structure of application software. The application framework can include a user interface toolkit, a data model (to store and retrieve data), a business logic layer (e.g., business rules of the application), and/or a deployment framework (to deploy the DFP workflows to a production environment). The computing system also includes one or more processing devices operatively coupled to the one or more memory devices, the one or more processing devices to execute the instructions to perform various operations. The operations can generate, by the unsupervised training pipeline, a set of user models, where each of the set of user models is associated with one of a set of accounts and is trained to detect an anomalous pattern using feature data associated with the one account. Each account of the set of accounts is associated with at least one of a user, a machine, or a service. The set of accounts can be identified by a network address identifier that uniquely identifies the network address for a user, a machine, a service, or the like. The operations can detect, by the inference pipeline, a first anomalous pattern in first data associated with a first account of the set of accounts using a first user model of the set of user models and detect, by the inference pipeline, a second anomalous pattern in second data associated with a second account of the set of accounts using a second user model of the set of user models. In particular, the operations can extract first feature data associated with the first account and use the first feature data to detect the first anomalous pattern corresponding to the first account. Similarly, the operations can extract second feature data associated with the second account and use the second feature data to detect the second anomalous pattern corresponding to the second account.

In at least one embodiment, the DFP workflow can include a set of scripts, and a shared model store. The DFP workflow can identify, using the set of scripts, a data source associated with the set of accounts. The data source can include a first set of data items, each data item being associated with one account of the set of accounts (e.g., network address identifier). The DFP workflow can extract, by the unsupervised training pipeline from the data source, first feature data for each data item. The DFP workflow can train, by the unsupervised training pipeline, the set of user models and store the set of user models in the shared model store. During inference, the DFP workflow can identify, from the data source, one or more additional data items associated with the first account of the set of accounts and extract, by the inference pipeline from the data source, second feature data for each of the one or more additional data items. The DFP workflow can retrieve from the shared model store using the inference pipeline, the first user model associated with the first account. The DFP work can generate, by the inference pipeline using the first user model, an anomaly score for each of the one or more additional data items. The DFP workflow can detect, by the inference pipeline, the first anomalous pattern using the anomaly score for each of the one or more additional data items.

In at least one embodiment, the DFP workflow can identify, from the data source, one or more additional data items associated with the second account. The DFP workflow can extract, by the inference pipeline from the data source, third feature data for each of the one or more additional data items associated with the second account. The DFP workflow can retrieve from the shared model store using the inference pipeline, the second user model associated with the second account. The DFP workflow can generate, by the inference pipeline using the second user model, an anomaly score for each of the one or more additional data items associated with the second account. The DFP workflow can detect, by the inference pipeline, the second anomalous pattern using the anomaly score for each of the one or more additional data items associated with the second account.

In at least one embodiment, the application framework includes a set of tunable parameters. A first parameter can specify a location of the data source. A second parameter can specify a set of one or more input features including at least one of a categorical feature, a numerical feature, or a binary feature. A third parameter can specify a threshold criterion for classifying an anomalous pattern. The categorical feature can include an application display name, a client application type, a username, a browser type, an operating system type, a result, a status failure reason, a risk event type, an Internet Protocol (IP) address, a location, a phone number, or the like. The categorical feature can include more than the listed items. A categorical feature can be any item that is a string or convertible into a string. The "categories" are determined by finding unique strings in the input dataset. For example, the browser type category could be determined by taking logs, finding the set of unique browser names, and then assigning a category identifier to each unique browser name. The numerical feature can include a log count, a location increment, and/or an increment of unique applications accessed in a period. The binary feature can include a Boolean status for the following features, for example: IP address private, IP address multicast, IP address global, IP address unspecified, ip address reserver, IP address loopback, IP address link local, or the like.

In at least one embodiment, one or more memory devices can store an application framework with a DFP workflow having a set of scripts and a reference architecture comprising an unsupervised training pipeline and an inference pipeline. One or more processing devices operatively coupled to the one or more memory devices can execute the instructions to perform the following operations. The processing device(s) can identify, using the set of scripts, a data source associated with a set of accounts for pattern anomaly detection. The data source can include a first set of data items, each data item being associated with one of the set of accounts. Each account is associated with at least one of a user, a machine, or a service. The processing device(s) can extract from the data source, using the unsupervised training pipeline, first feature data for each data item. The processing device(s) can train, using the unsupervised training pipeline, a set of user models. Each user model is associated with one account of the set of accounts and is trained, using the first feature data associated with the respective account, to detect a pattern anomaly for the respective account. The processing device(s) can store the set of user models in the shared model store. The processing device(s) can identify, from the data source, one or more additional data items associated with a first account of the set of accounts. The processing device(s) can extract from the data source, using the inference pipeline, second feature data for each of the one or more additional data items. The processing device(s) can retrieve from the shared model store using the inference pipeline, a first user model of the set of user models, the first user model being associated with the first account. The processing device(s) can generate, using the first user model, an anomaly score for each of the one or more additional data items. The processing device(s) can detect, using the inference pipeline, a first anomalous pattern using the anomaly score for each of the one or more additional data items. Additional details of the DFP training pipeline and the DFP inference pipeline are described below.

Training Pipeline

Figure 5:
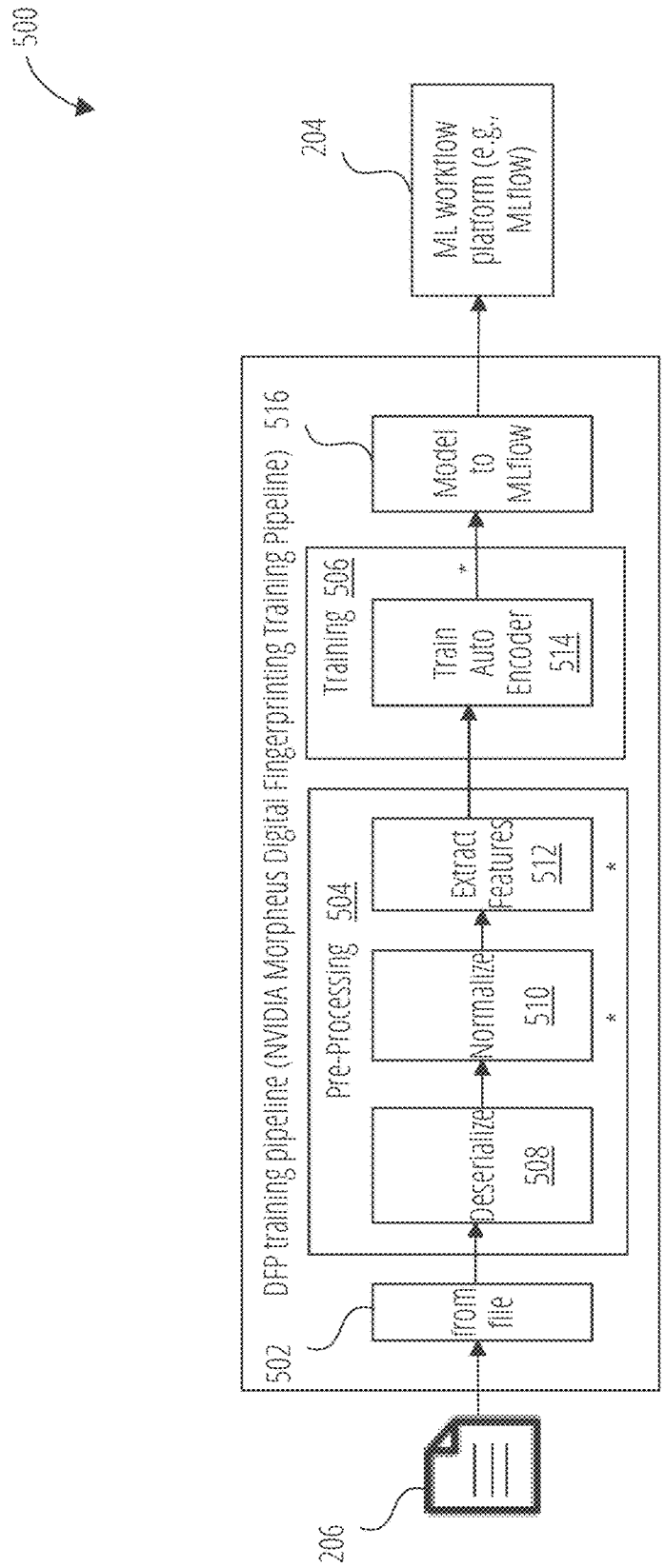
FIG. 5 is a block diagram of a DFP training pipeline according to at least one embodiment.

FIG. 5 is a block diagram of a DFP training pipeline 500 according to at least one embodiment. The DFP training pipeline 500 can retrieve from authentication logs 206 (or other data items) from a file 502 (or other data sources). Prior to executing training stage 506, there is a pre-processing stage 504. The pre-processing stage 504 can deserialize the data from the file 502, normalize 510 the data, and extract features 512. The training stage 506 can train an ML model per account using an autoencoder, as described in more detail below. The trained models, unique per account, are delivered 516 to the ML workflow platform 204 (e.g., open-source MLflow platform) via code (e.g., Python). In some embodiments, a generic model is also trained for inferencing events with an unknown account. The generic model can also be trained and delivered to the ML workflow platform 204.

In at least one embodiment, the DFP training pipeline 500 is an unsupervised training pipeline that can generate a set of user models, each being is associated with one of a set of accounts and trained to detect an anomalous pattern using feature data associated with the one account. Each account is associated with at least one of a user, a machine, or a service.

In at least one embodiment, the DFP training pipeline 500 includes a set of scripts and a shared model store. The DFP training pipeline 500 can identify, using the set of scripts, a data source associated with the set of accounts. The data source includes a first set of data items, each data item being associated with one of the set of accounts. The DFP training pipeline 500 can extract, by the unsupervised training pipeline from the data source, first feature data for each data item. The DFP training pipeline 500 can train, by the unsupervised training pipeline, the set of user models and store the set of user models in the shared model store.

Inferencing Pipeline

Figure 6:
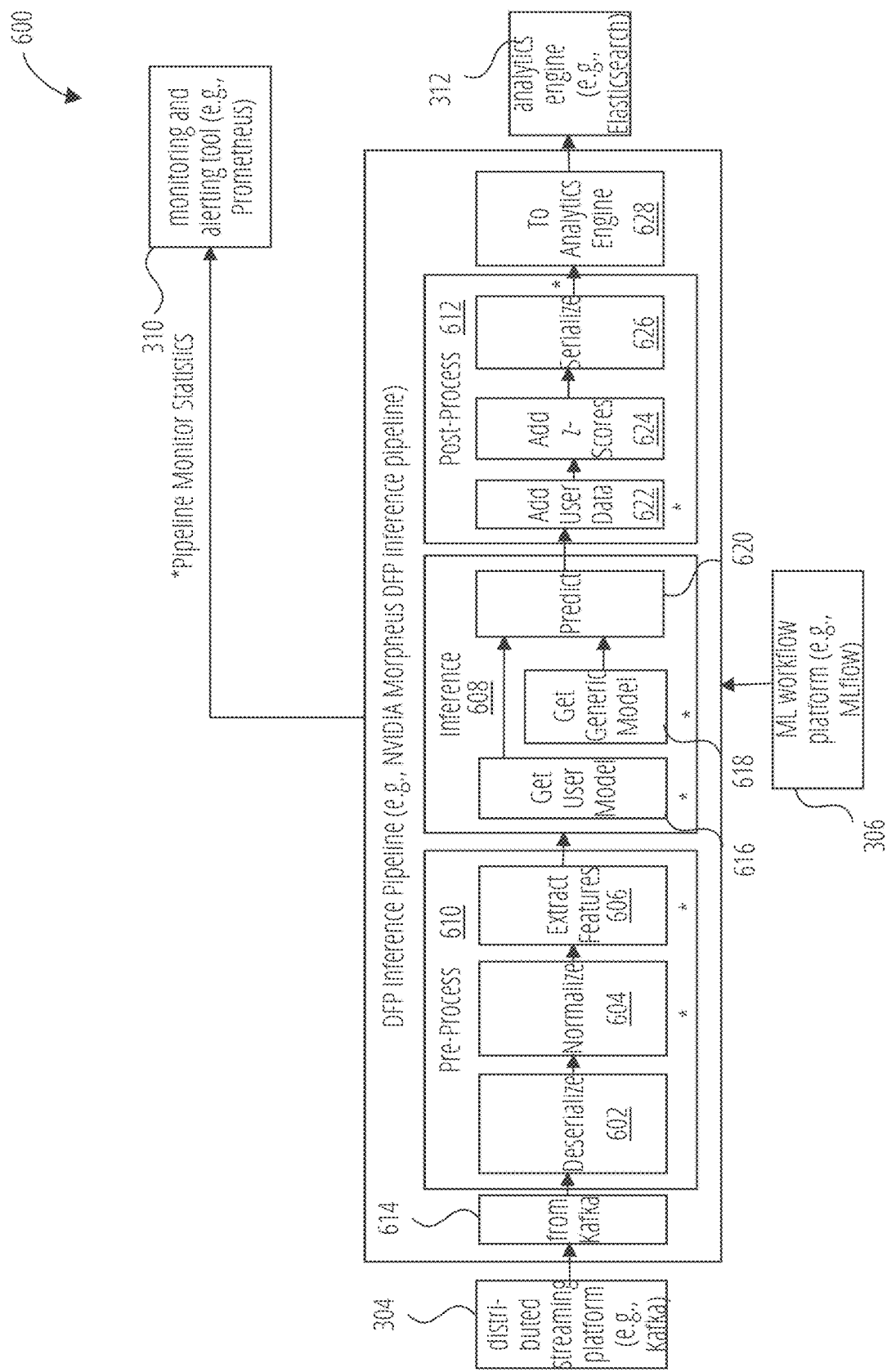
FIG. 6 is a block diagram of a DFP inference pipeline according to at least one embodiment.
Figure 7:
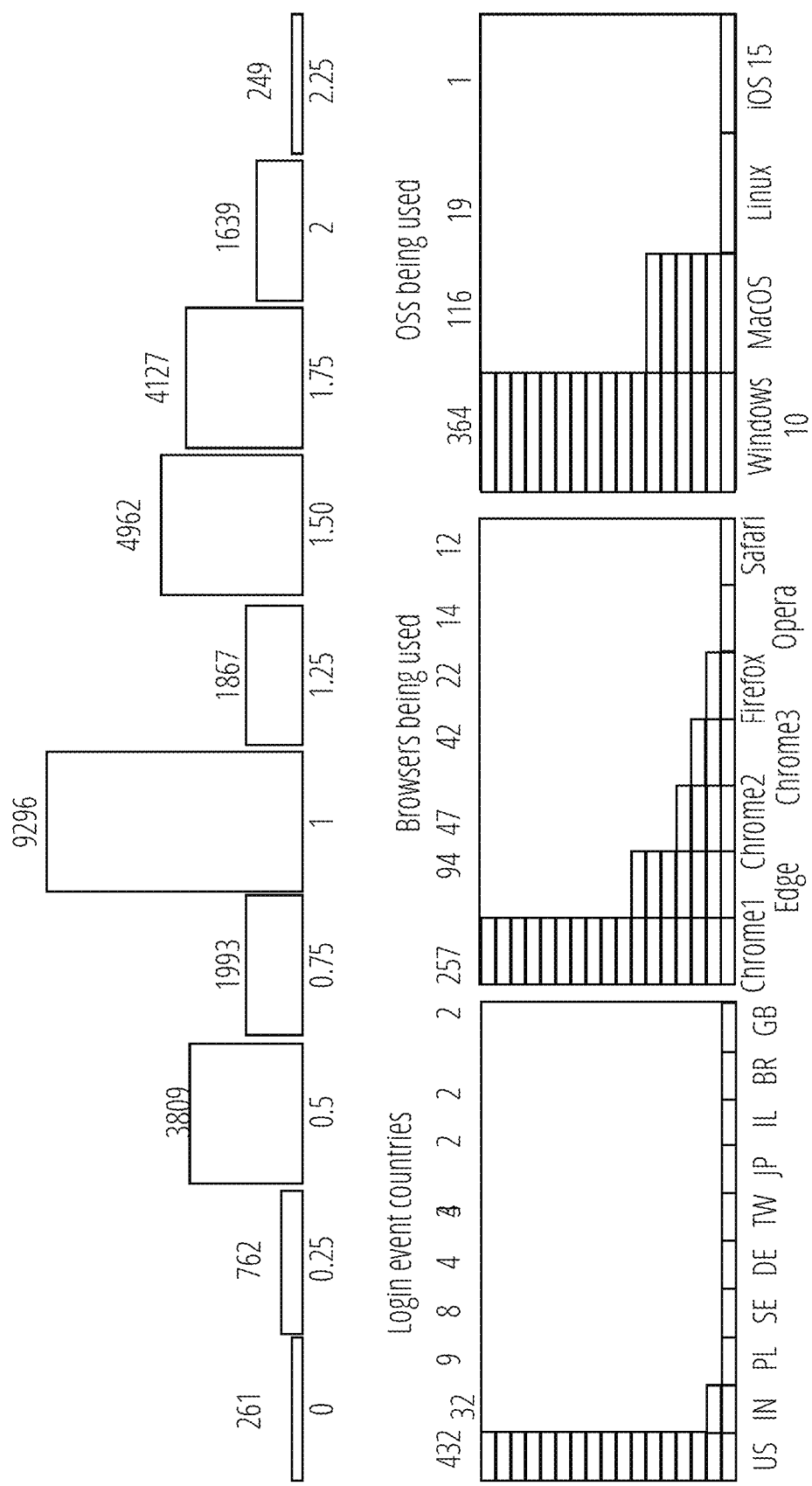
FIG. 7 is a graphical user interface (GUI) dashboard with pipeline performance metrics according to at least one embodiment.

FIG. 6 is a block diagram of a DFP inference pipeline 600 according to at least one embodiment. In addition to an inference stage 608, the DFP inference pipeline 600 includes a pre-processing stage 610 and a post-processing stage 612. The DFP inference pipeline 600 can retrieve data 614 from the distributed streaming platform 304. In at least one embodiment, Apache Kafka is used to bring raw event data into the DFP inference pipeline 600. The pre-processing stage 610 can deserialize the data 614, normalize 604 the data, and extract features 606. The inference stage 608 gets a user model 616 corresponding to the respective account and a generic model 618 from the shared model store from the ML workflow platform 306. In at least one embodiment, the user model 616 and generic model 618 can be loaded using MLflow's API. The inference stage 608 can predict whether the data has an anomalous pattern using either the user model 616 or the generic model 618. The generic model 618 can be used when the account is unknown or there is no trained model for the known account. The post-processing stage 612 can add user data 622, add anomaly score 624, and serialize 626 the data. The DFP inference pipeline 600 can deliver 628 the serialized data to the analytics engine 312. The serialized data can represent security event data. The security event data sent to analytics engine 312 can be provided to tools like Kibana to analyze the results. The output can also be sent to the monitoring and alerting tool 310. The monitoring and alerting tool 310 can store pipeline performance metrics, enabling a system administrator to leverage tools like Grafana to visualize the overall health and throughput of the DFP inference pipeline 600. An example GUI dashboard with pipeline performance metrics is illustrated in FIG. 7. These third-party, open-source platform components can be easily swapped out to use components within an Enterprise commercial platform.

In at least one embodiment, the DFP inference pipeline 600 can detect a first anomalous pattern in first data associated with a first account of the set of accounts using a first user model of the set of user models. The DFP inference pipeline 600 can detect a second anomalous pattern in second data associated with a second account of the set of accounts using a second user model of the set of user models.

In at least one embodiment, the DFP inference pipeline 600 includes a set of scripts and a shared model store. The DFP inference pipeline 600 can identify, from the data source, one or more additional data items associated with the first account of the set of accounts. The DFP inference pipeline 600 can extract, by the inference pipeline from the data source, second feature data for each of the one or more additional data items. The DFP inference pipeline 600 can retrieve from the shared model store using the inference pipeline, the first user model associated with the first account. The DFP inference pipeline 600 can generate, by the inference pipeline using the first user model, an anomaly score for each of the one or more additional data items. The DFP inference pipeline 600 can detect, by the inference pipeline, the first anomalous pattern using the anomaly score for each of the one or more additional data items.

In at least one embodiment, the DFP inference pipeline 600 can identify, from the data source, one or more additional data items associated with the second account. The DFP inference pipeline 600 can extract, by the inference pipeline from the data source, third feature data for each of the one or more additional data items associated with the second account. The DFP inference pipeline 600 can retrieve from the shared model store using the inference pipeline, the second user model associated with the second account. The DFP inference pipeline 600 can generate, by the inference pipeline using the second user model, an anomaly score for each of the one or more additional data items associated with the second account. The DFP inference pipeline 600 can detect, by the inference pipeline, the second anomalous pattern using the anomaly score for each of the one or more additional data items associated with the second account.

In at least one embodiment, the DFP inference pipeline 600 can train, by the unsupervised training pipeline, an organization model. The organization model is associated with a group of accounts of the set of accounts and is trained using the first feature data associated with the group of accounts. The DFP inference pipeline 600 can store the organization model in the shared model store. The DFP inference pipeline 600 can identify, from the data source, one or more additional data items associated with a third account of the set of accounts. The DFP inference pipeline 600 can extract, by the inference pipeline from the data source, second feature data for each of the one or more additional data items associated with the third account. The DFP inference pipeline 600 can determine that the shared model store does not store a user model associated with the third account. The DFP inference pipeline 600 can determine that the third account is associated with the group of accounts. The DFP inference pipeline 600 can retrieve from the shared model store using the inference pipeline, the organization model being associated with the group of accounts. The DFP inference pipeline 600 can generate, by the inference pipeline using the organization model, an anomaly score for each of the one or more additional data items associated with the third account. The DFP inference pipeline 600 can detect, by the inference pipeline, an anomalous pattern using the anomaly score for each of the one or more additional data items associated with the third account.

In at least one embodiment, the DFP inference pipeline 600 can train, by the unsupervised training pipeline, an enterprise model. The enterprise model is associated with a group of organizations, each organization having a group of accounts of the set of accounts. The enterprise model is trained using the first feature data associated with the group of organizations. The DFP inference pipeline 600 can store the enterprise model in the shared model store. The DFP inference pipeline 600 can identify, from the data source, one or more additional data items associated with a third account of the set of accounts. The DFP inference pipeline 600 can extract from the data source by the inference pipeline, second feature data for each of the one or more additional data items associated with the third account. The DFP inference pipeline 600 can determine that the shared model store does not store a user model associated with the third account. The DFP inference pipeline 600 can determine that the third account is associated with the group of organizations. The DFP inference pipeline 600 can retrieve from the shared model store using the inference pipeline, the enterprise model being associated with the group of accounts. The DFP inference pipeline 600 can generate, by the inference pipeline using the enterprise model, an anomaly score for each of the one or more additional data items associated with the third account. The DFP inference pipeline 600 can detect, by the inference pipeline, an anomalous pattern using the anomaly score for each of the one or more additional data items associated with the third account.

In at least one embodiment, the unsupervised training pipeline includes an autoencoder with an encoder to receive an input vector and generate a latent space representation of the input vector and a decoder to receive the latent space representation and generate a reconstructed input vector. The unsupervised training pipeline can train the autoencoder to minimize a reconstruction loss between the input vector and the reconstructed input vector to obtain a trained autoencoder. The inference pipeline can use the trained autoencoder to generate a reconstruction loss value (e.g., an anomaly score). A reconstruction loss value that satisfies a threshold criterion indicates an anomalous pattern. In at least one embodiment, the input vector includes at least one or more of the following features: binary (also referred to as "Boolean"), numerical, or categorical. In at least one embodiment, the DFP inference pipeline 600 can determine a categorical cross-entropy (CCE) loss associated with the categorical feature. CCE is a loss function primarily used for multi-class classification tasks. It compares the predicted probability distribution of classes to the true class labels. CCE calculates the average of the negative logarithm of the predicted probabilities of the correct classes. It penalizes the model more if it predicts the wrong class with high confidence. CCE is suitable when the classes are mutually exclusive, and an input can only belong to one class. The DFP inference pipeline 600 can determine a binary cross-entropy (BCE) loss associated with the binary feature. BCE is a loss function commonly used in binary classification tasks. It measures the dissimilarity between predicted probabilities and true binary labels. BCE calculates the average of the negative logarithm of the predicted probabilities for the true classes. It penalizes the model more for predicting incorrect probabilities for the positive class. BCE is appropriate when there are only two classes or when each sample can be assigned to multiple classes independently. The DFP inference pipeline 600 can determine a mean squared error (MSE) loss associated with the numerical feature. MSE is a loss function used in regression tasks to evaluate the difference between predicted continuous values and true values. It calculates the average squared difference between predictions and ground truth. MSE penalizes larger deviations more heavily than smaller ones, making it sensitive to outliers. It is commonly used when the target variable is continuous, and the goal is to minimize the average squared error between predictions and true values. CCE, BCE, and MSE are commonly used loss functions in machine learning and deep learning algorithms. They quantify the difference between predicted values and actual values, allowing models to learn and optimize their performance. In other embodiments, other loss functions can be used. Additional details of the autoencoder are described below with respect to FIG. 17 to FIG. 20.

In at least one embodiment, the unsupervised training pipeline trains the user models using time-series models. The time-series models can be per account, user, machine, or the like.

FIG. 7 is a GUI dashboard with distributions of anomaly scores according to at least one embodiment.

Software Development in the Cloud

Cybersecurity developers use this reference workflow to develop locally or within the cloud. To develop the DFP training pipeline 202 in the cloud, the DFP reference workflow can use a web server, as illustrated and described below, with respect to FIG. 8.

Figure 8:
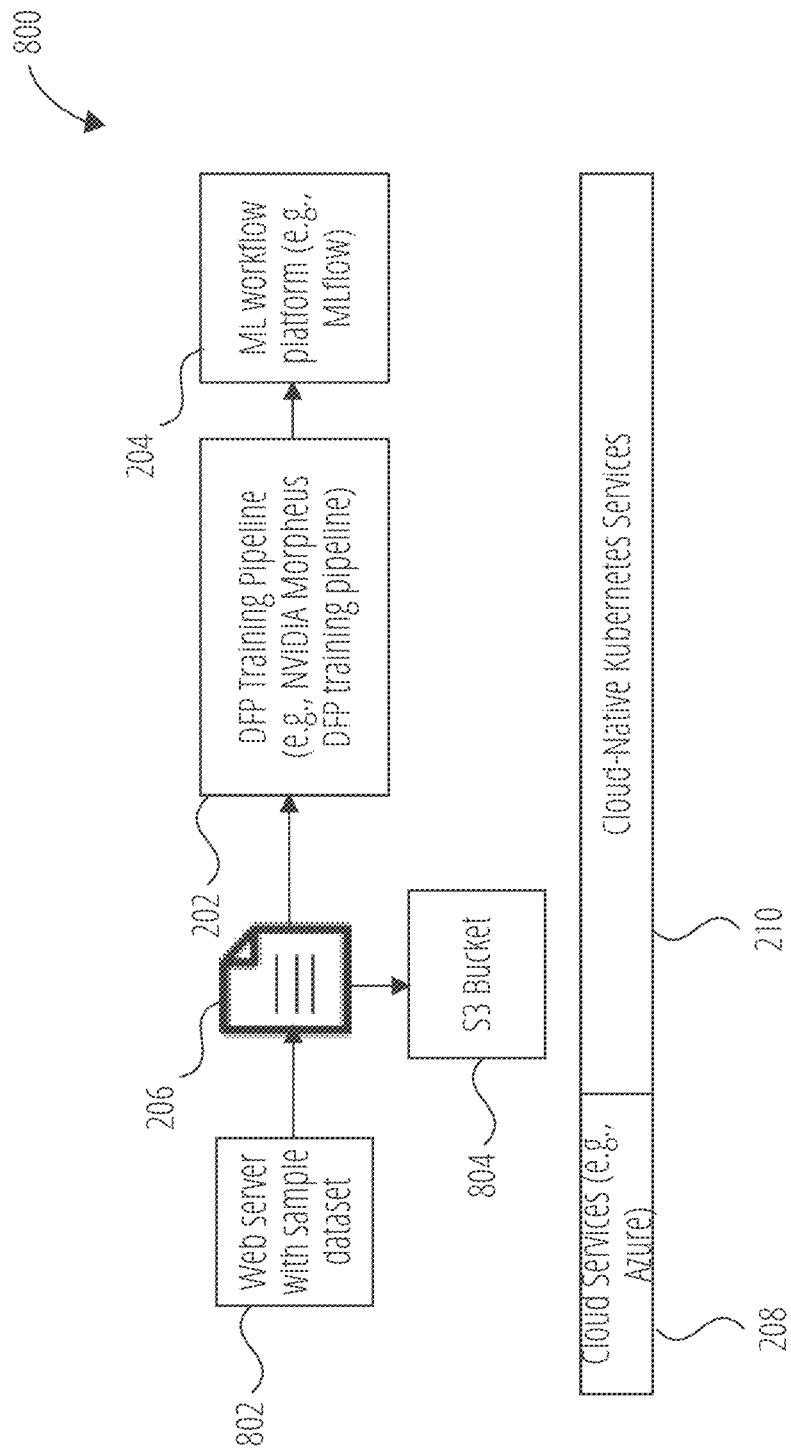
FIG. 8 is a block diagram of a DFP training pipeline architecture with a web server that produces a randomized dataset for the DFP training pipeline according to at least one embodiment.

FIG. 8 is a block diagram of a DFP training pipeline architecture 800 with a web server that produces a randomized dataset for the DFP training pipeline 202 according to at least one embodiment. The DFP training pipeline architecture 800 is similar to DFP training pipeline architecture 200 as noted by similar reference numbers, except the DFP training pipeline architecture 800 includes a web server 802 that produces a randomized dataset to the DFP training pipeline 202. The training scripts can also copy this randomized dataset to an object bucket 804 (e.g., S3 bucket) for archival.

To develop DFP inference pipeline 302 in the cloud, the DFP reference workflow can use the distributed streaming platform to bring the dataset into the DFP inference pipeline 302, as illustrated and described below with respect to FIG. 9.

Figure 9:
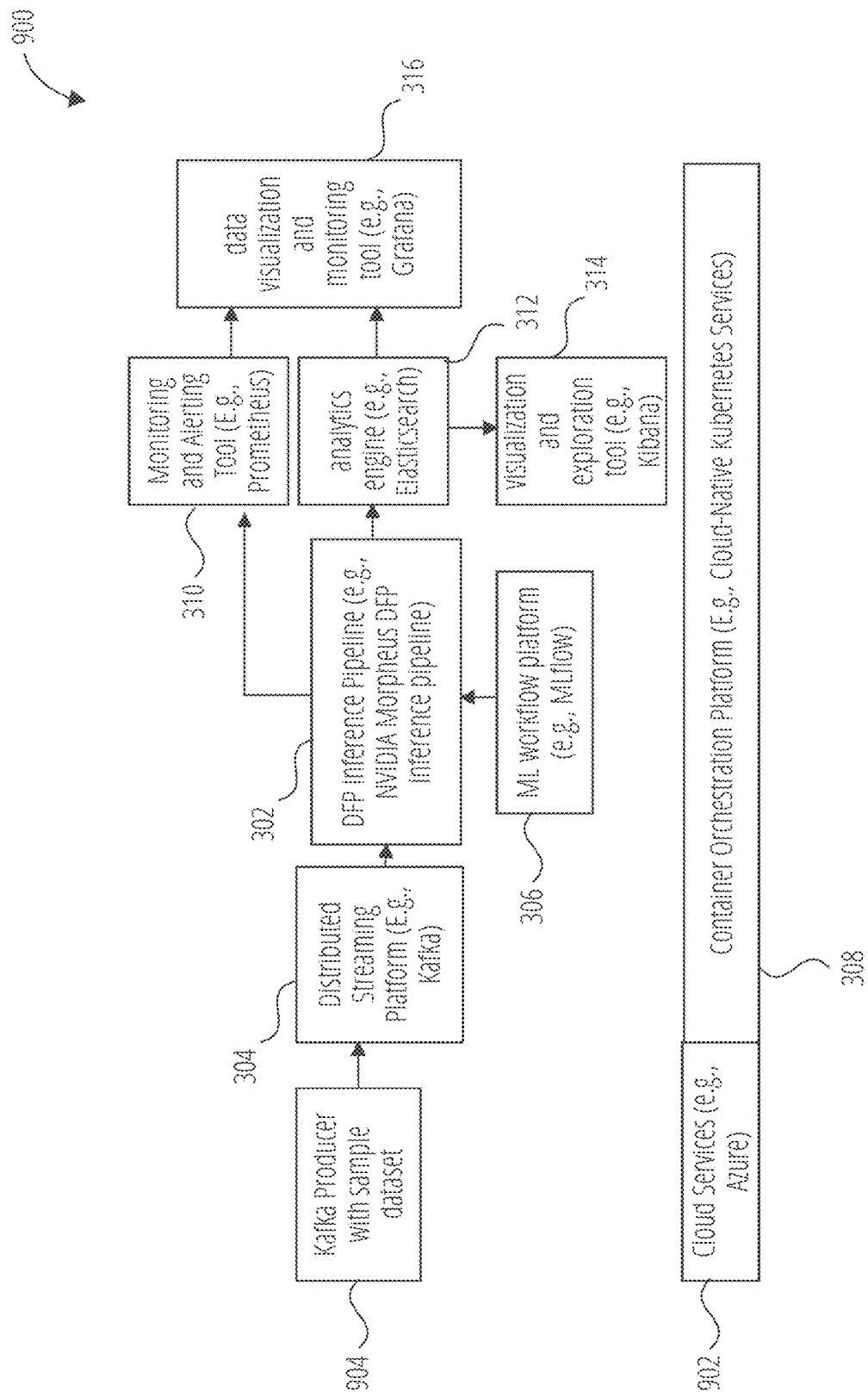
FIG. 9 is a block diagram of a DFP inference pipeline architecture with a distributed streaming platform for providing a dataset to the DFP inference pipeline according to at least one embodiment.

FIG. 9 is a block diagram of a DFP inference pipeline architecture 900 with a distributed streaming platform 304 for providing a dataset to the DFP inference pipeline 302 according to at least one embodiment. The distributed streaming platform 304 can be or include a Kafka connector that is used to bring a dataset into the DFP inference pipeline 302. A Kafka Producer 904 can provide the sample dataset, and the Kafka connector can be used to bring the dataset into the DFP inference pipeline 302. A Kafka Producer and a Kafka Connector are two components of Apache Kafka, an open-source distributed streaming platform. A Kafka Producer is a client application or component that publishes data to Kafka topics. It is responsible for sending messages or records to Kafka brokers, which then distribute these records to the appropriate Kafka topic partitions. Producers can be developed in various programming languages, including Java, Python, and others, using the Kafka client libraries. The Kafka Producers are designed to send messages or records to Kafka topics. They can publish data in various formats, such as strings, JSON, Avro, or binary. A Kafka Connector is a plugin or framework that enables seamless integration between Kafka and other data systems or services. It facilitates the movement of data between Kafka topics and external systems. Connectors are responsible for the configuration, transformation, and synchronization of data. Kafka Producers and Connectors work together to form a robust and scalable data streaming architecture. Producers publish data to Kafka topics, and Connectors enable integration between Kafka and external systems, making it easy to ingest and distribute data in real-time. In at least one embodiment, the Kafka producer 904 can be implemented as part of cloud services 902 (e.g., Azure cloud services).

Production Digital Fingerprinting

Once Cybersecurity developers are ready to deploy into production, Azure Cloud Services can be further utilized. Azure AD activity logs will be archived in an S3 bucket and used within the DFP training pipeline 202 (e.g., Morpheus training pipeline), as illustrated in FIG. 10.

Figure 10:
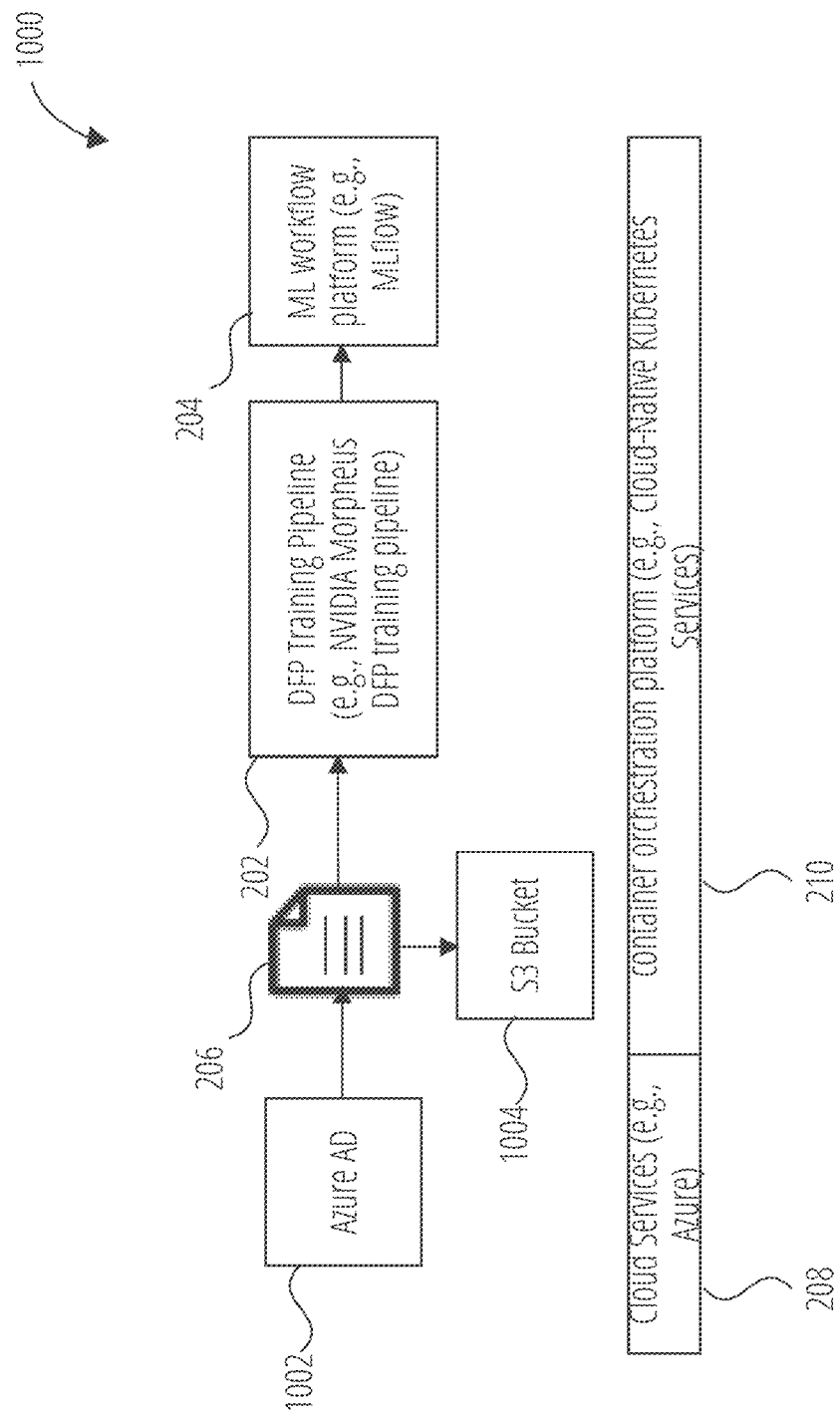
FIG. 10 is a block diagram of a production DFP training pipeline according to at least one embodiment.

FIG. 10 is a block diagram of a production DFP training pipeline 1000 according to at least one embodiment. Azure AD 1002 can provide authentication logs 206 (e.g., Azure AD activity logs) to the DFP training pipeline 202. The training scripts can also provide a copy to an object bucket 1004 (e.g., S3 bucket) for archival. It should be noted that the use of Azure AD and S3 are exemplary technologies that can be used. The DFP reference workflow can work with any log type in any location to give a sense of identity or pattern.

Figure 11:
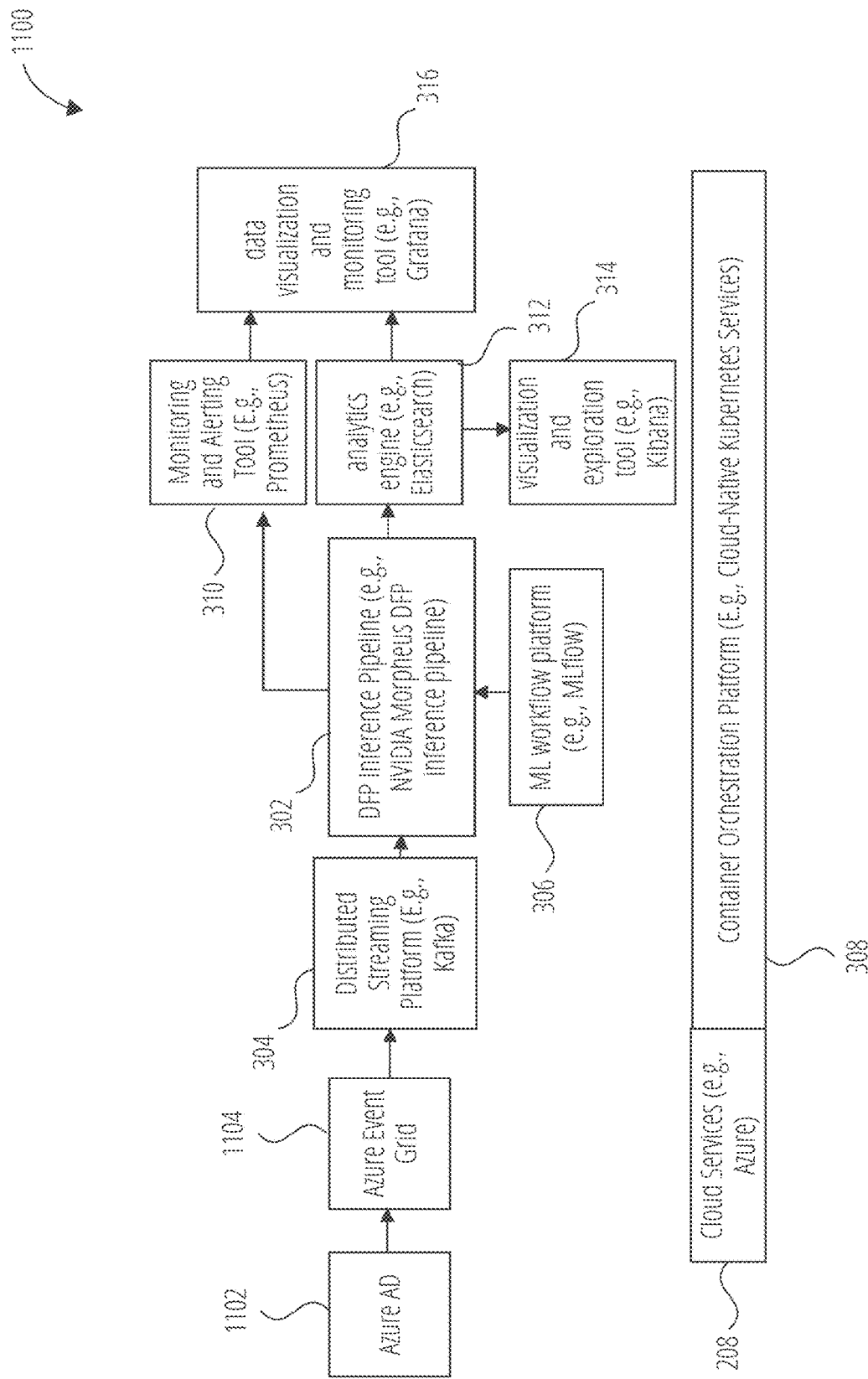
FIG. 11 is a block diagram of a production DFP inference pipeline according to at least one embodiment.

FIG. 11 is a block diagram of a production DFP inference pipeline 1100 according to at least one embodiment. Azure AD 1102 and Azure event grid 1104 of the cloud services 208 can be used to provide data to the production DFP inference pipeline 1100. It should be noted that the use of Azure AD and S3 are example technologies that can be used. The DFP reference workflow can work with any log type in any location to give a sense of identity or pattern.

Figure 12:
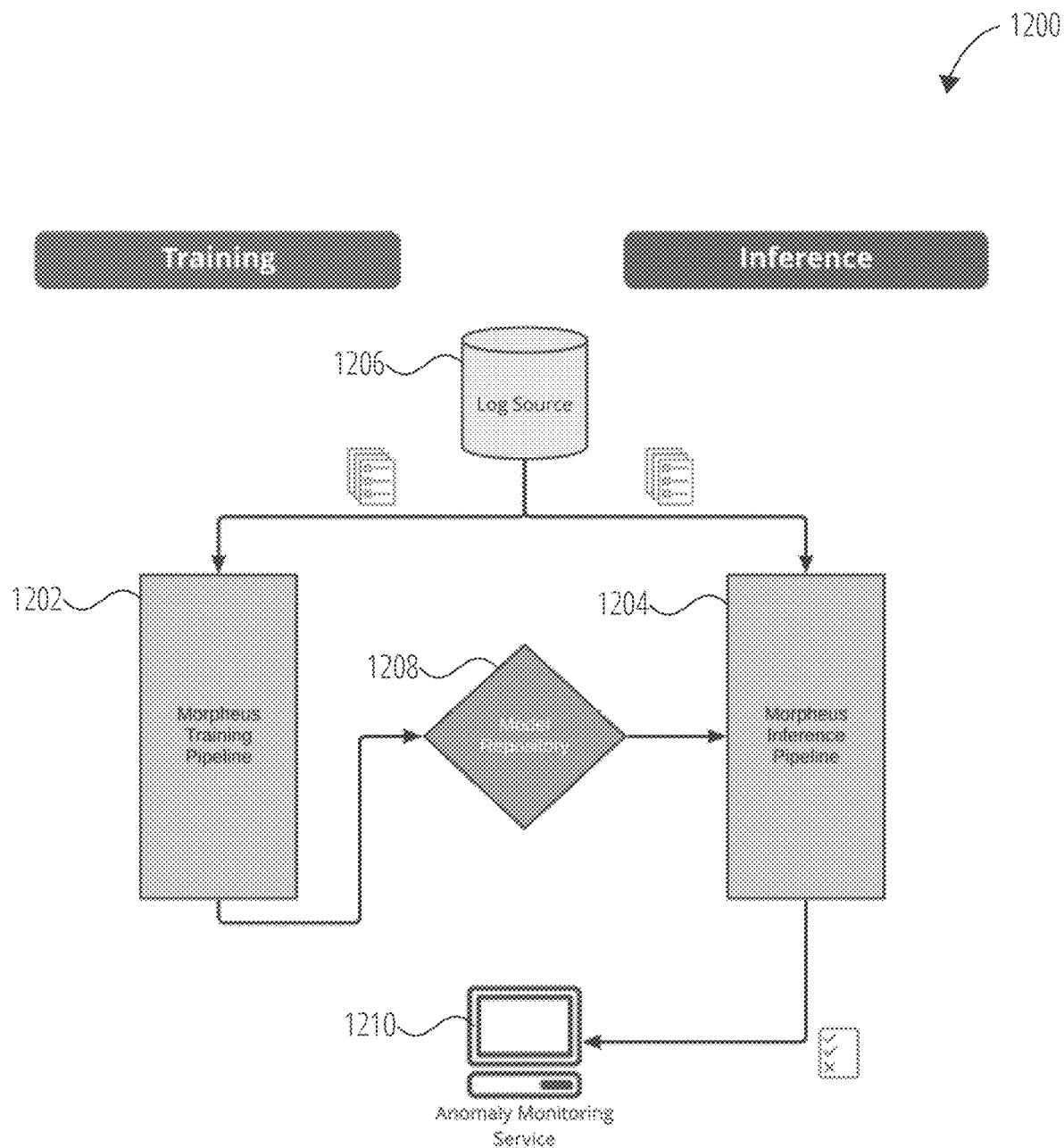
FIG. 12 is a block diagram of a high-level architecture of a DFP system according to at least one embodiment.

FIG. 12 is a block diagram of a high-level architecture of a DFP system 1200 according to at least one embodiment. The DFP system 1200 includes training pipeline 1202, inference pipeline 1204, log source 1206, model repository 1208, and anomaly monitoring service 1210. The training pipeline 1202 and inference pipeline 1204 can communicate via the model repository 1208, which is a shared model store.

The training pipeline 1202 can train user models, an enterprise model, an organization model, or other generic models and upload them to the model repository 1208. The training pipeline 1202 can train individual user models and fallback models for users using training data from the log source 1206. The inference pipeline 1204 can download the user models, the enterprise model, the organization model, or other generic models from the model repository 1208. In at least one embodiment, the model repository 1208 can be implemented using the MLflow models for model load/store and versioning. In at least one embodiment, Python APIs provide necessary Representational State Transfer (REST) integration. REST is an architectural style that provides a set of guidelines and constraints for designing networked applications. It is commonly used in web services to facilitate communication and interoperability between systems.

The inference pipeline 1204 can generate anomaly scores per each log in the log source 1206. The inference pipeline 1204 can receive real-time data from the log source 1206 and provide the anomaly score for each item in the real-time data. The inference pipeline 1204 can send the detected anomalies to the anomaly monitoring service 1210. The output anomalies from the inference pipeline 1204 can be stored in an object bucket (e.g., an S3 bucket). The object bucket can be integrated into the anomaly monitoring service 1210. The anomaly monitoring service 1210 can generate a GUI dashboard with the output anomalies to help system administrators identify anomalous patterns described herein.

The training pipeline 1202 and inference pipeline 1204 can share many common components. The DFP system 1200 can fit well into a cybersecurity framework, such as Nvidia Morpheus, developed by Nvidia of Santa Clara, CA. Morpheus is a cloud-native application framework designed to enhance cybersecurity capabilities by leveraging AI and ML techniques to provide real-time AI/ML-powered security analytics for large-scale networks and data centers. Morpheus can reuse stages and mix and match pipelines, so the DFP system 1200 is well suited for the Morpheus paradigm.

In some embodiments, the DFP system 1200 can use customizable tools and systems to fulfill DFP requirements for an enterprise. In at least one embodiment, the log source 1206 can use Duo and Azure logs stored in JSON format in an object bucket, like an S3 bucket. The log source 1206 has its access controlled by Hashicorp Vault. New logs in the log source 1206 can be detected via polling. In some embodiments, the DFP system 1200 can use a GPU-accelerated container runtime environment. The GPU-accelerated container runtime environment can have a Kubernetes deployment via provided helm charts. The DFP system 1200 can be executed in cloud providers (e.g., EKS, GKE, AKS, etc.). In some embodiments, the additional docker-compose configuration can be used for development and testing.

In at least one embodiment, a DFP reference workflow can be used to operate the DFP system 1200. The DFP reference workflow can have multiple stages, including a first stage to set up the runtime environment, a second stage to configure the cybersecurity framework (e.g., Morpheus configuration), a third stage for training models, and a fourth stage for inference using the trained models. In the first stage, the DFP reference workflow can download and deploy service containers, connect to the development environment, and configure a secret manager. In the second stage, the DFP reference workflow can specify one or more input data stores, create model features, and specify output monitoring system(s). In the third stage, the DFP reference workflow can train a generic user model, an enterprise model, an organization model, and/or multiple user models as described herein. In the fourth stage, the DFP reference workflow can start processing new log data and monitor for results/anomalies (e.g., anomalous patterns).

Each data source provides a unique set of information about cyber activities. There can be a high number of fields, while many of them are unpopulated or irrelevant to the problem being solved. Data analysis can help quickly identify good and bad candidates for raw features.

The following steps are general guidelines on feature selection for custom DFP applications: 1) data overview: scan through the features to understand what is available; 2) overall statistics: collect global statistics for each feature to rule out bad fits; 3) per-entity statistics: collect entity-level statistics for each feature to further evaluate their "usefulness"; 4) feature correlation: evaluate the correlation between feature candidates to remove redundancy: and 5) review with security experts: run the feature candidates by security experts to make sure they are meaningful and relevant to the problem being solved.

It should be noted that a digital fingerprint can be determined from activity by any entity, such as a user interacting with applications or machines. Digital fingerprints can also be determined from activity by an application interacting with a user or a machine. Fingerprints can be determined on an entity basis. The entity can be identified by any unique entity ID including an account identifier, network address identifier, or machine identifier. The data being collected needs to specify the entity identifier to be used to train a user model associated with the account or make inferences using the user model.

Figure 13:
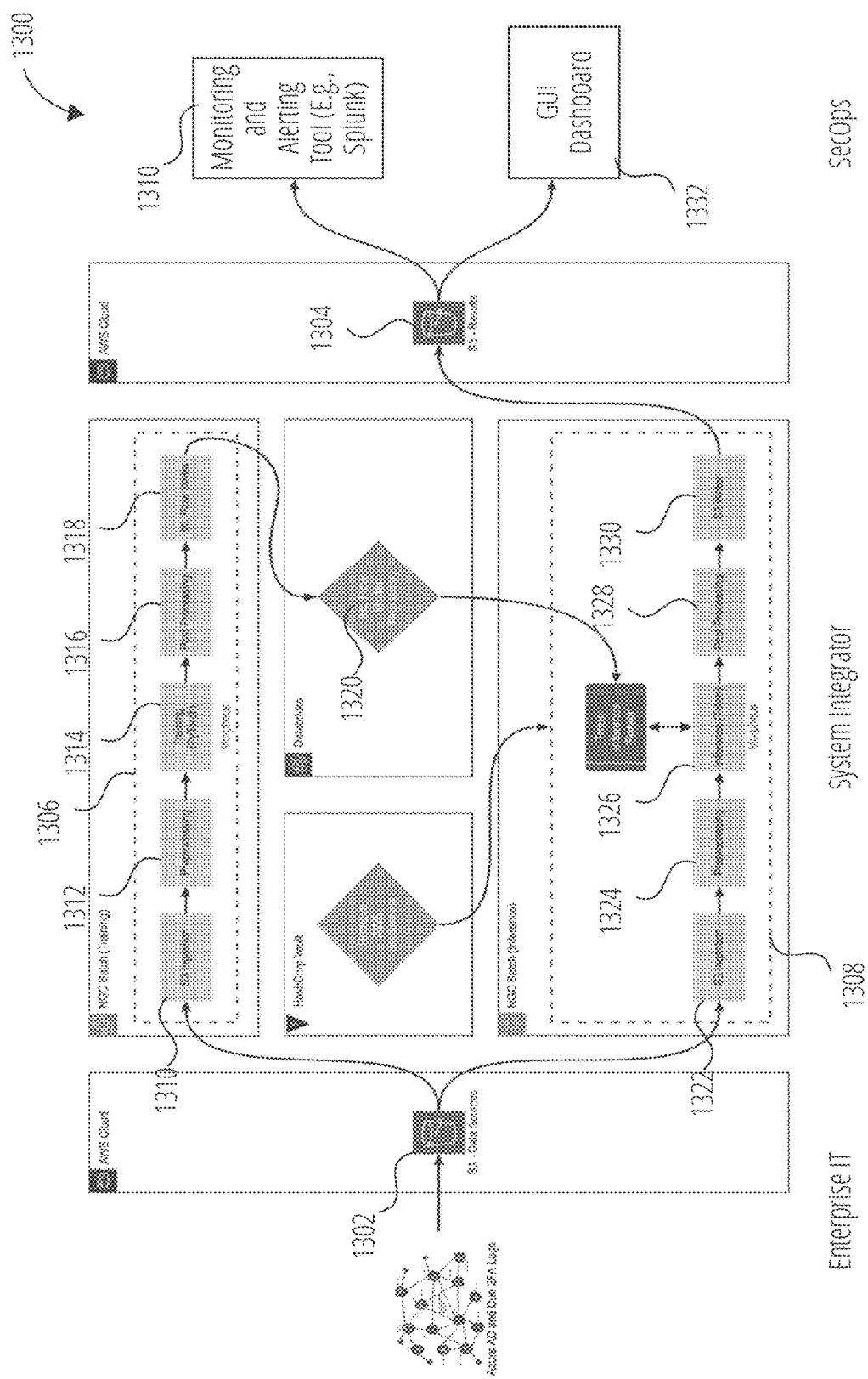
FIG. 13 is a block diagram of a DFP system deployed in a product security environment according to at least one embodiment.

FIG. 13 is a block diagram of a DFP system 1300 deployed in a product security environment according to at least one embodiment. The DFP system 1300 can retrieve data from data source(s) 1302. The data can be Azure AD and Duo two-factor authentication (2FA) logs. The data can be training data that is ingested into a training pipeline 1306. The training pipeline 1306 can be implemented in a cloud-based platform (e.g., Nvidia GPU Cloud (NGC)). NGC is a cloud-based platform that offers GPU-optimized software for AI, ML, and high-performance computing (HPC). The operations of the training pipeline 1306 can be implemented as an NGC batch, which is a collection or group of jobs or tasks that are submitted together for processing. The training pipeline 1306 can include multiple software components, including object bucket ingestion block 1310, pre-processing block 1312, training block 1314, post-processing block 1316, and deployment block 1318. The ingestion block 1310 can ingest training data from the data source(s) 1302. The ingestion block 1310 can be an S3 reader. The pre-processing block 1312, training block 1314, and post-processing block 1316 can perform similar operations described above with respect to FIG. 5. The deployment block 1318 can deploy the trained models to a model repository 1320.

The data in the data source(s) 1302 can be real-time data that is ingested into an inference pipeline 1308. The training pipeline 1306 can be implemented in a cloud-based platform (e.g., NGC). The training pipeline 1306 and inference pipeline 1308 can be implemented on the same or separate instances of the cloud-based platform. The operations of the training pipeline 1306 can be implemented as an NGC batch. The inference pipeline 1308 can include multiple software components, including object bucket ingestion block 1322, pre-processing block 1324, inference block 1326, post-processing block 1328, and object bucket writer 1330. The ingestion block 1322 can ingest real-time data from the data source(s) 1302. The ingestion block 1322 can be an S3 reader. The pre-processing block 1324, inference block 1326, and post-processing block 1328 can perform similar operations described above with respect to FIG. 6. The object bucket writer 1330 can store results 1304 in an object bucket. The results 1304 can be used by a monitoring and alerting tool 310. The results 1304 can be used to generate a GUI dashboard 1332.

Figure 14:
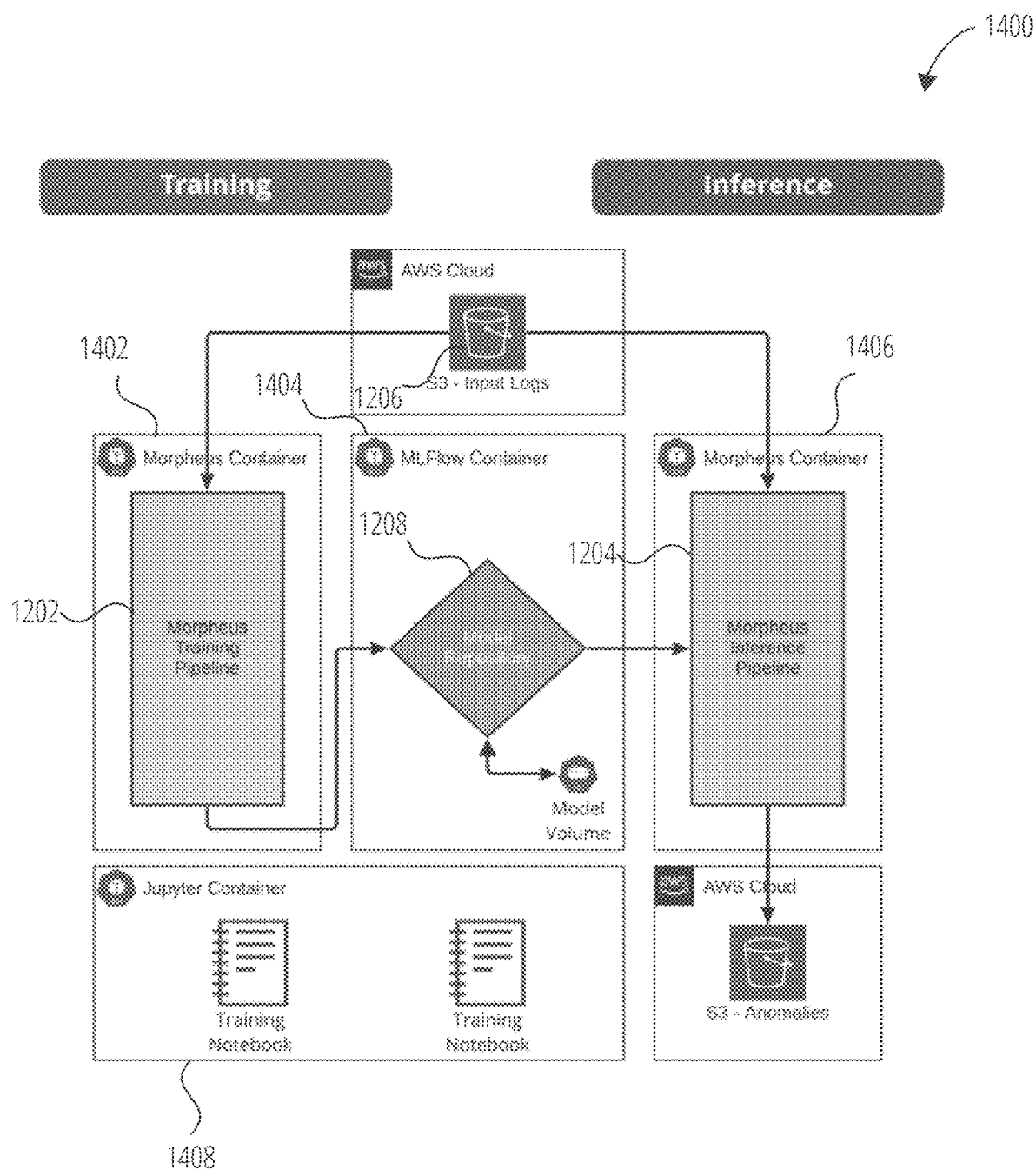
FIG. 14 is a block diagram of a high-level architecture of a DFP system according to at least one embodiment.

FIG. 14 is a block diagram of a high-level architecture of a DFP system 1400 according to at least one embodiment. The DFP system 1400 is similar to the DFP system 1200 as noted by similar reference numbers, except the training pipeline 1202 is implemented in a first container 1402, the training pipeline 1202 is implemented in a second container 1404, and the model repository 1208 is implemented in a third container 1406. A container is a lightweight, isolated, and portable environment that packages an application and its dependencies together. It encapsulates the software and its components, including libraries, binaries, configuration files, and runtime environment, into a single self-contained unit. The log source 1206 can be implemented in S3 bucket(s) in the AWS cloud. The results of the inference pipeline 1204 can be stored in S3 bucket(s) in the AWS cloud. In at least one embodiment, one or more training notebooks can be stored in a fourth container 1408. The training notebooks can be Jupyter notebooks. A Jupyter notebook is an open-source web application that allows users to create and share documents containing live code, visualizations, explanatory text, and multimedia elements. It should be noted that the training notebooks (and the containers in the figures) are two ways of running the same thing. The notebooks are designed for experimentation in format data scientists are used to. The containers are designed for production environments that computer scientists are used to. Both can run the same exact Morpheus inference and training pipelines.

In at least one embodiment, the DFP system 1400 can be implemented in the Morpheus platform, which is built as an application of containerized services. The platform provides a flexible architecture with minimum overhead to get started. The platform can be easily scaled to meet demand. The DFP reference architecture can be run in two ways: 1) using docker-compose for testing and development or 2) using helm charts for production Kubernetes deployment.

In at least one embodiment, the DFP system 1400 can be run via docker-compose. Docker and docker-compose can be installed on a host machine. The host machine can support GPU with a docker runtime environment. In at least one embodiment, the DFP system 1400 can be run via Kubernetes. The Kubernetes cluster can be configured with GPU resources. A GPU operator can be installed in the cluster.

In at least one embodiment, the DFP system 1400, the reference architecture, can use MLflow to provide a versioned model store, Juypter Server to provide necessary information for testing and deployment of the pipelines, a Morpheus training pipeline that trains autoencoder models and uploads to Mlflow, and a Morpheus inference pipeline that downloads models from the Mlflow for inferencing. The Morpheus training pipeline can train individual models for each account, as well as generic models, enterprise models, and/or organization models. The Morpheus inference pipeline can upload results (anomalies) to one or more tools, such as a monitoring and alerting tool (e.g., Prometheus).

In at least one embodiment, the training pipeline 1202 and inference pipeline 1204 can be provided as both a script (e.g., Python scrip) and a training notebook. The Python scripts can be used in a production environment. Jupyter notebooks can be used to make training easier since they are familiar to data scientists. The Jupyter notebooks can run the entire pipeline. The Python scripts can provide extra flexibility for more advanced users, and are more familiar with computer scientists. The Python scripts can allow Integrated Development Environment (IDE) debugging using VS Code or a similar IDE.

The Morpheus DFP pipeline can have flexibility with plug-and-play stages that can be mixed and matched with little impact. For example, the S3 Reader can be swapped with a File Reader for debugging. The S3 Writer can be swapped with a Kafka Writer to push anomalies to a message bus. Stages in the core pipelines can perform common actions that should be configured, but not necessarily exchanged, keeping the core pipeline unchanged. The Jupyter notebooks can be used for experimenting with different stages of the DFP workflow.

Figure 15:
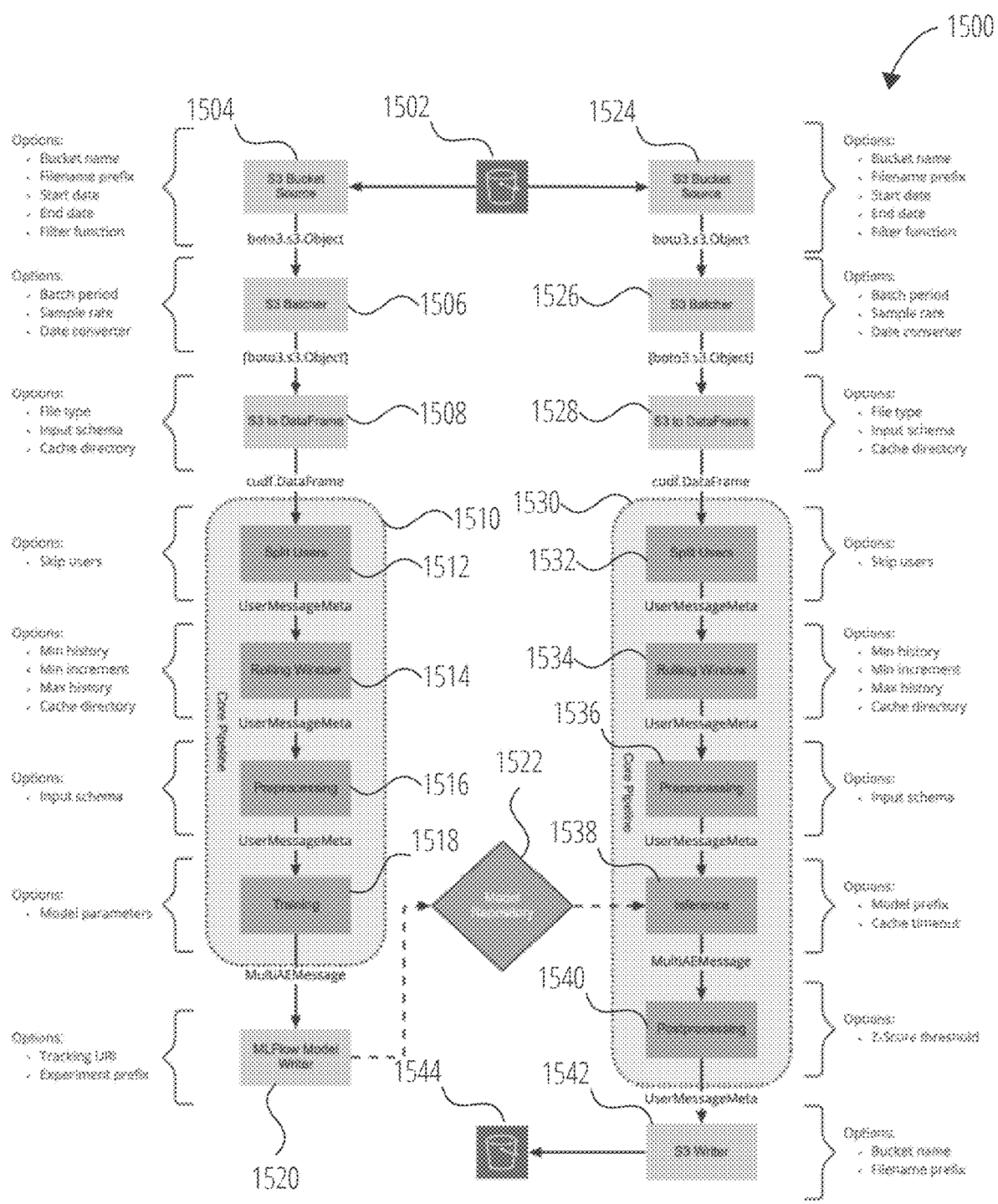
FIG. 15 is a flow diagram of a DFP system according to at least one embodiment.

FIG. 15 is a flow diagram of a DFP system 1500 according to at least one embodiment. For training, the DFP system 1500 starts with identifying and reading data from an object bucket 1502 (block 1504). At block 1504, the DFP system 1500 can identify a bucket name, a filename prefix, a start date, an end date, and any filter function on what data is read from the object bucket 1502. At block 1506, the DFP system 1500 can batch one or more jobs or tasks into a batch. The DFP system 1500 can identify a batch period, a sample rate, and a data converter. At block 1508, the DFP system 1500 can convert the batch to a data frame. The DFP system 1500 can identify a file type, an input scheme, and a cache directory for the core pipeline 1510. At block 1512, the core pipeline 1510 can split the data frame according to users (accounts). In some cases, some users can be skipped at this stage. The core pipeline 1510 can process the data in a rolling window (block 1514). The rolling window can turn a continuous stream of data into discrete windows for training. This may be necessary because the models are being continuously retrained as new data comes in by combining the new data with historical data and then retraining the model. However, it is very inefficient to retrain the model for every new log as it arrives. So, the rolling window can batch new data until there is enough to make it worthwhile to retrain the model. Likewise, it would be impossible to maintain an infinite amount of historical data, so the oldest data can be discarded after a certain threshold. This results in the model being trained on a series of overlapping windows of log data where the size of the windows (max history), spacing between the windows (min increment), and start point of the windows (min history) can be controlled by the rolling window stage. The core pipeline 1510 can specify a minimum history, a minimum increment, a maximum history, and a cache directory for the rolling window. At block 1516, the core pipeline 1510 can perform pre-processing operations as described herein. The core pipeline 1510 can specify an input scheme for the preprocessing. It should be noted that the input scheme can be used to determine the features (e.g., categorical, numerical, binary). At block 1518, the core pipeline 1510 can perform training operations as described herein. The core pipeline 1510 can train multiple user models, an enterprise model, an organization model, a fallback model, or the like. The core pipeline 1510 can specify model parameters. Once a user model is trained at block 1518, the DFP system 1500 can send the model to a model repository 1522 to be stored.

For inference, the DFP system 1500 starts with identifying and reading data from an object bucket 1502 (block 1524). At block 1524, the DFP system 1500 can identify a bucket name, a filename prefix, a start date, an end date, and any filter function on what data is read from the object bucket 1502. At block 1526, the DFP system 1500 can batch one or more jobs or tasks into a batch. The DFP system 1500 can identify a batch period, a sample rate, and a data converter. At block 1528, the DFP system 1500 can convert the batch to a data frame. The DFP system 1500 can identify a file type, an input scheme, and a cache directory for the core pipeline 1530. At block 1532, the core pipeline 1530 can split the data frame according to users (accounts). In some cases, some users can be skipped at this stage. The core pipeline 1510 can process the data in a rolling window (block 1514). The core pipeline 1530 can specify a minimum history, a minimum increment, a maximum history, and a cache directory for the rolling window. At block 1536, the core pipeline 1530 can perform pre-processing operations as described herein. The core pipeline 1530 can specify an input scheme for the preprocessing. At block 1538, the core pipeline 1530 can perform inference operations as described herein. The core pipeline 1530 can obtain a user model from the model repository 1522 for data corresponding to the respective user. The core pipeline 1530 can use a model prefix to retrieve the respective user model. At block 1538, the core pipeline 1530 can perform inferences using a user model, an enterprise model, an organization model, a fallback model, or the like. The core pipeline 1530 can also specify a cache timeout. The core pipeline 1530 can perform post-processing operations as described herein. In at least one embodiment, the core pipeline 1530 can calculate an anomaly score (e.g., Z-score). The core pipeline 1530 can specify an anomaly score threshold (e.g., Z-score threshold). The core pipeline 1530 can output anomalies that have an anomaly score that exceeds the anomaly score threshold. The DFP system 1500 can send the results to an object bucket 1544 (block 1542). The DFP system 1500 can specify a bucket name and a filename prefix for the results stored in the object bucket 1544.

As described above, the DFP system 1500 can use autoencoders and/or time-series models to accomplish the task of finding anomalous patterns. An overall view of the core DFP pipeline is illustrated and described below with respect to FIG. 17.

Figure 16:
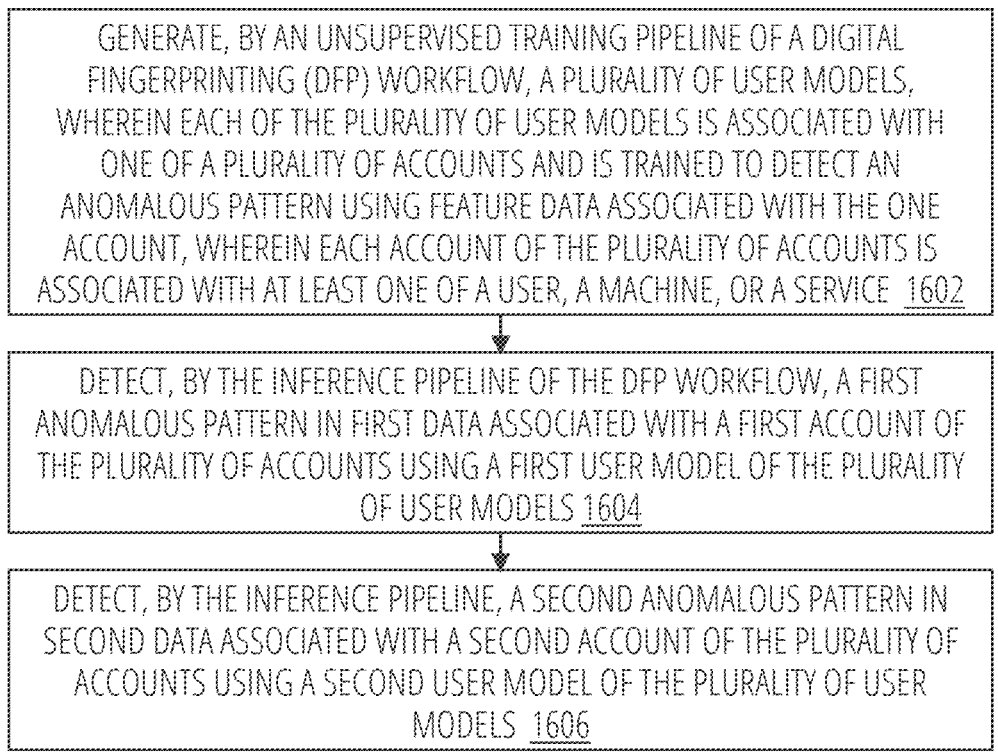
FIG. 16 is a flow diagram of a method for generating user models and using the user models to detect anomalous patterns according to at least one embodiment.

FIG. 16 is a flow diagram of a method 1600 for generating user models and using the user models to detect anomalous patterns according to at least one embodiment. The method 1600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 1600 is performed by the DFP system 100 of FIG. 1. In one embodiment, some portions of the method 1600 are performed by the DFP training pipeline architecture 200 of FIG. 2 and other portions are performed by the DFP inference pipeline architecture 300 of FIG. 3. In one embodiment, some portions of the method 1600 are performed by the DFP training pipeline 500 of FIG. 5 and other portions are performed by DFP inference pipeline 600 of FIG. 6. In one embodiment, some portions of the method 1600 are performed by the DFP training pipeline architecture 800 of FIG. 8 and other portions are performed by the DFP inference pipeline architecture 900 of FIG. 9. In one embodiment, some portions of the method 1600 are performed by the production DFP training pipeline 1000 of FIG. 10 and other portions are performed by the production DFP inference pipeline 1100 of FIG. 11. In one embodiment, the method 1600 is performed by the DFP system 1200 of FIG. 12, the DFP system 1300 of FIG. 13, the DFP system 1400 of FIG. 14, or the DFP system 1500 of FIG. 15.

Referring to FIG. 16, the method 1600 begins with the processing logic generating, by an unsupervised training pipeline of a DFP workflow, a plurality of user models (block 1602). Each of the plurality of user models is associated with one of a plurality of accounts and is trained to detect an anomalous pattern using feature data associated with the one account. Each account of the plurality of accounts is associated with at least one of a user, a machine, or a service. At block 1604, the processing logic detects, by an inference pipeline of the DFP workflow, a first anomalous pattern in first data associated with a first account of the plurality of accounts using a first user model of the plurality of user models. At block 1606, the processing logic detects, by the inference pipeline, a second anomalous pattern in second data associated with a second account of the plurality of accounts using a second user model of the plurality of user models.

In a further embodiment, the processing logic identifies, using a set of scripts of the DFP workflow, a data source associated with the plurality of accounts. The data source comprises a first plurality of data items, each data item being associated with one of the plurality of accounts. The processing logic extracts, by the unsupervised training pipeline from the data source, first feature data for each data item. The processing logic trains, by the unsupervised training pipeline, the plurality of user models. The processing logic stores the plurality of user models in a shared model store.

In a further embodiment, the processing logic identifies, from the data source, one or more additional data items associated with the first account of the plurality of accounts. The processing logic extracts, by the inference pipeline from the data source, second feature data for each of the one or more additional data items. The processing logic retrieves from the shared model store using the inference pipeline, the first user model associated with the first account. The processing logic generates, by the inference pipeline using the first user model, an anomaly score for each of the one or more additional data items. The processing logic detects, by the inference pipeline, the first anomalous pattern using the anomaly score for each of the one or more additional data items.

In a further embodiment, the processing logic identifies, from the data source, one or more additional data items associated with the second account. The processing logic extracts, by the inference pipeline from the data source, third feature data for each of the one or more additional data items associated with the second account. The processing logic retrieves from the shared model store using the inference pipeline, the second user model associated with the second account. The processing logic generates, by the inference pipeline using the second user model, an anomaly score for each of the one or more additional data items associated with the second account. The processing logic detects, by the inference pipeline, the second anomalous pattern using the anomaly score for each of the one or more additional data items associated with the second account.

In a further embodiment, the processing logic receives an input vector at an autoencoder of the unsupervised training pipeline. The processing logic generates a latent space representation of the input vector. The processing logic generates a reconstructed input vector based on the latent space representation. The processing logic trains the autoencoder using batches of inputs to minimize a reconstruction loss between the input vectors and the reconstructed input vectors to obtain a trained autoencoder. In at least one embodiment, to detect the first anomalous pattern, the processing logic generates, using the trained autoencoder, a reconstruction loss value. The processing logic detects the first anomalous pattern responsive to the reconstruction loss value satisfying a threshold criterion.

In at least one embodiment, the input vector includes at least one or more of the following features: binary, numerical, or categorical. The processing logic can determine a CCE loss associated with the categorical feature, a BCE loss associated with the binary feature, and an MSE loss associated with the numerical feature.

Figure 17:
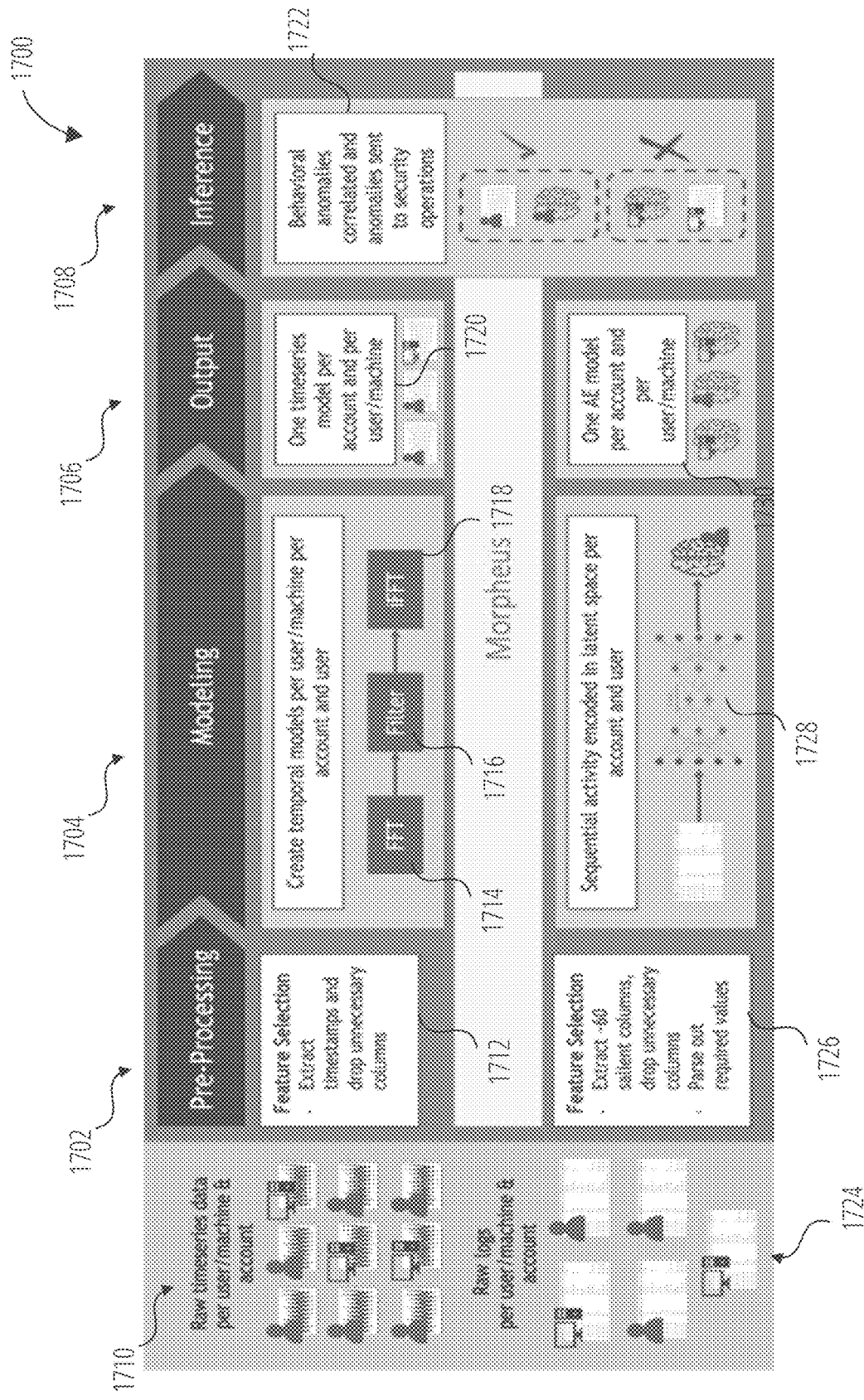
FIG. 17 is a block diagram of a core DFP pipeline 1700 with time-series model(s) and autoencoder model(s) to identify behavioral anomalies according to at least one embodiment.

FIG. 17 is a block diagram of a core DFP pipeline 1700 with time-series model(s) 1720 and autoencoder models 1730 to identify behavioral anomalies according to at least one embodiment. The same core DFP pipeline 1700 can be configured to train and use time-series model(s) 1720, autoencoder 1728, or both to accomplish the task of identifying anomalous patterns in real-time data.

Time-series models can be statistical or deep learning models used to analyze and forecast data that changes over time. They are specifically designed to capture and understand patterns, trends, and dependencies in sequential data points collected at regular intervals. There are various types of time-series models, including for example, Vector Autoregression (VAR), Long Short-Term Memory (LSTM) Networks, or the like.

An autoencoder is a type of artificial neural network that is primarily used for unsupervised learning and dimensionality reduction. It aims to learn a compressed representation or encoding of input data and then reconstruct the original input from this encoded representation. Autoencoders are composed of an encoder and a decoder, which are trained together to perform this encoding and decoding process. Additional details of autoencoders are described below with respect to FIG. 18 to FIG. 20.

In at least one embodiment, the core DFP pipeline 1700 has a pre-processing stage 1702, a modeling stage 1704, an output stage 1706, and an inference stage 1708. For the time-series models, the core DFP pipeline 1700 obtains raw time-series data 1710. The raw time-series data 1710 can be obtained per account, user, machine, service, or the like. At the pre-processing stage 1702, the core DFP pipeline 1700 can perform feature selection 1712 to extract timestamps and drop any unnecessary data (e.g., unnecessary columns). At the modeling stage 1704, the core DFP pipeline 1700 can use a Fast Fourier Transform (FFT) 1714, a filter 1716, and an inverse FFT (IFFT) 1718 to create and train temporal models based on the features selected at pre-processing stage 1702. At modeling stage 1704, the core DFP pipeline 1700 can create temporal models per use/machine/account/etc. At the output stage 1706, the core DFP pipeline 1700 can output one time-series model(s) 1720 per account (or per machine/user/etc.) to a model repository. The time-series model(s) 1720 can be used at an inference stage 1708. At the inference stage 1708, the core DFP pipeline 1700 can correlate behavioral anomalies in an anomaly correlation stage 1722. The anomalies can be sent to security operations or systems.

In at least one embodiment, for autoencoder models, the core DFP pipeline 1700 can obtain raw logs 1724. The raw logs 1724 can be raw logs per account, user, machine, etc. The core DFP pipeline 1700 can perform feature selection 1726 to extra salient columns, drop unnecessary columns, and parse out required values. At the modeling stage 1704, the core DFP pipeline 1700 can use autoencoder 1728 to encode sequential activity in latent space per account and decode to obtain reconstructed data in order to create and train an autoencoder model 1730 per account (or per machine/user/etc.). At the output stage 1706, the core DFP pipeline 1700 can output one autoencoder model 1730 per account (or per machine/user/etc.) to the model repository. The autoencoder model 1730 can be used at the inference stage 1708. At the inference stage 1708, the core DFP pipeline 1700 can correlate behavioral anomalies in the anomaly correlation stage 1722. The anomalies can be sent to security operations or systems.

Described herein are methodologies for training and using both highly targeted individual models as well as larger, customized aggregate models to flag anti-pattern behavior (also referred to as anomalous patterns) in an enterprise environment. Described herein is a set of techniques that provide both intelligent thresholding (limiting) of alerts that is tunable by the user/developer as well as detailed, automatic explainability. Explainability and thresholding are large parts of digital fingerprinting. Limiting the number of alerts an analyst gets is important. Since core DFP pipeline 1700 scores every sequence of action, prioritization of alerts is necessary. In at least one embodiment, the core DFP pipeline 1700 can calculate the loss (reconstruction error) of each type of feature (categorical, binary, and numerical) and uses these numbers to create both an overall anomaly score as well as provide explainability information as illustrated and described below with respect to FIG. 18 to FIG. 20. Rather than looking at these collection of feature types, DFP explainability can look at each individual field (by itself), calculate those reconstruction errors, and use that to create a much more robust anomaly score. By surfacing what exact feature(s) resulted in the largest loss values, an analyst can zero in on what exactly caused this anti-pattern behavior and what trailheads are useful to investigate further.

Figure 18:
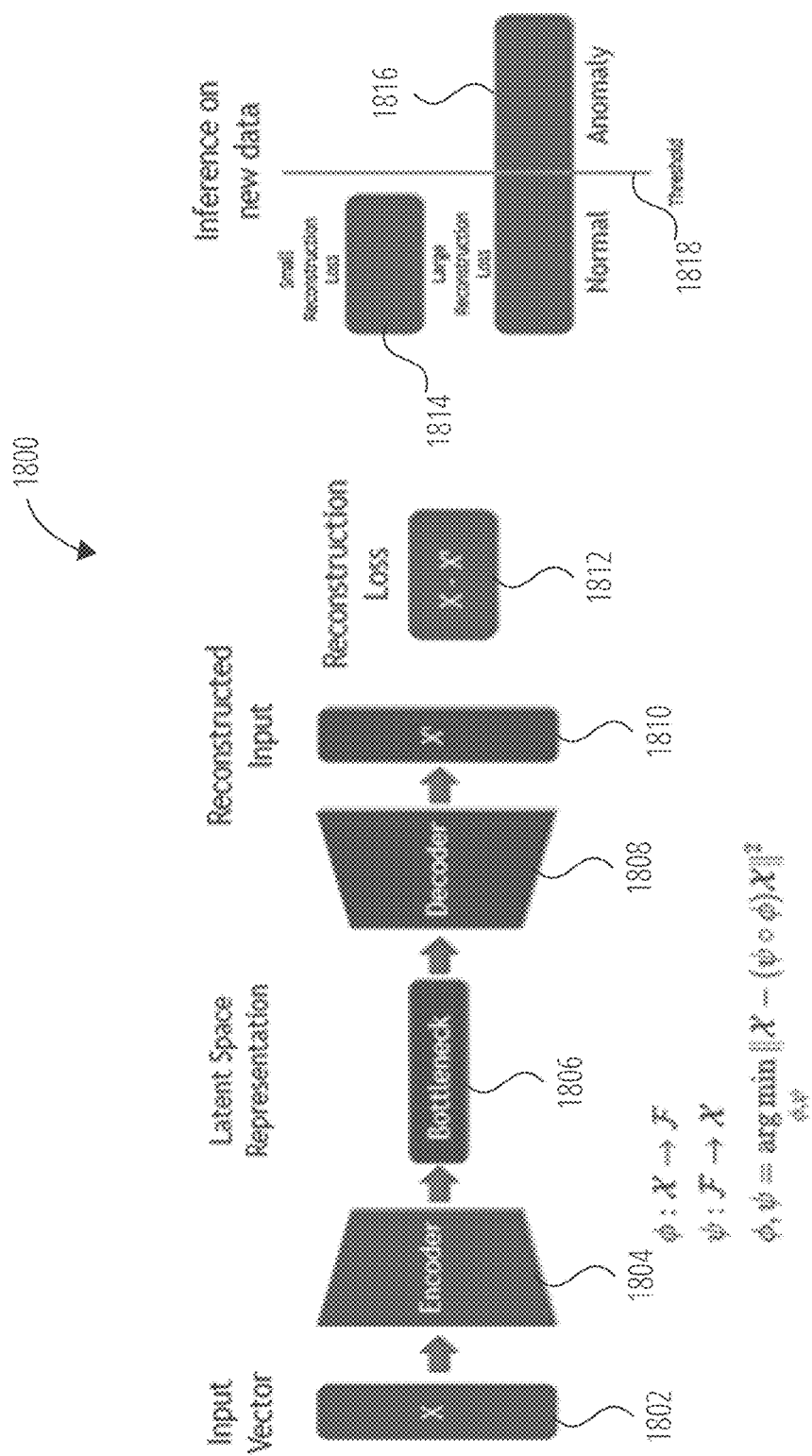
FIG. 18 illustrates an autoencoder model with a reconstruction loss for thresholding according to at least one embodiment.

FIG. 18 illustrates an autoencoder model 1800 with a reconstruction loss for thresholding according to at least one embodiment. The autoencoder model 1800, also referred to as simply autoencoder, includes an encoder 1804 and a decoder 1808. The unsupervised training pipeline can train the autoencoder model 1800 to obtain a trained autoencoder. The encoder 1804 can receive an input vector 1802 and generate a latent space representation. The autoencoder model 1800 can include a bottleneck layer 1806. The bottleneck layer 1806 refers to a layer or part of the network that represents the compressed or encoded representation of the input data. It is typically a layer with a lower dimensionality compared to the input and output layers. The bottleneck layer 1806 is responsible for capturing and representing the essential features or patterns of the input data in a compact form. It acts as a bottleneck because it forces the autoencoder to compress and encode the input information into a reduced-dimensional space. The purpose of having a bottleneck layer 1806 is to encourage the autoencoder to learn a compressed representation that captures the most salient information while discarding some of the less important or redundant details. By introducing this bottleneck layer 1806, the autoencoder is forced to extract and retain only the most relevant features needed for reconstruction. The bottleneck layer's dimensionality plays a critical role in determining the level of compression achieved by the autoencoder. A lower-dimensional bottleneck can result in a more compressed representation but might also lead to some loss of information. Conversely, a higher-dimensional bottleneck might retain more details but could reduce the effectiveness of dimensionality reduction. The decoder 1808 can receive the latent space representation from the 1806 and generate a reconstructed input vector 1810. The unsupervised training pipeline can train the autoencoder to minimize a reconstruction loss 1812 between the input vector 1802 and the reconstructed input vector 1810, resulting in a trained autoencoder for an inference stage. At the inference stage, an inference pipeline can calculate a reconstruction loss and determine whether the reconstruction loss satisfies a threshold criterion 1818. A reconstruction loss that satisfies the threshold criterion 1818 indicates an anomalous pattern. For example, a first reconstruction loss 1814 is less than the threshold criterion 1818, indicating normal behavior. A second reconstruction loss 1816 is greater than the threshold criterion 1818, indicating anomalous behavior. An inference pipeline can receive serialized real-time data, deserialize the serialized real-time data, and extract a set of features from the data. The inference pipeline can also normalize the data. The inference pipeline can obtain a user model containing the trained autoencoder (e.g., 1800). The inference pipeline can identify whether the data contains an anti-pattern that may represent a real-time threat in accounts across a network. The inference pipeline can output pipeline performance metrics to a first system and security event data associated with the real-time threat to a second system.

In at least one embodiment, the training pipeline or inference pipeline can generate the input vector 1802. The pipeline can convert features into log fields for the input vector 1802. In the context of log fields for vectors, it typically refers to the structured data fields within log entries that contain vector data. Log files are commonly used to store and analyze various types of data, including numerical vectors that represent multi-dimensional information. Also, log files can store binary values (e.g., true/false) or categorical information. The pipeline can convert binary values, numerical or continuous values, and categorical information to log fields for the input vector 1802, as illustrated in FIG. 19.

Figure 19:
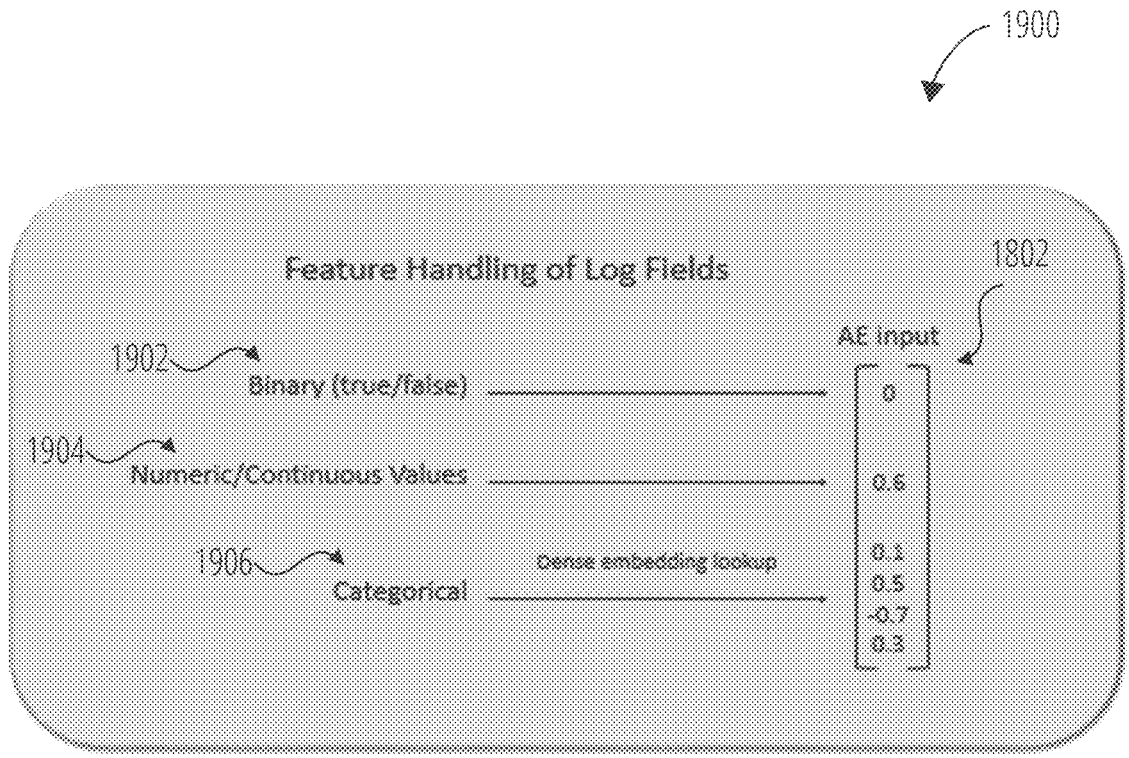
FIG. 19 illustrates feature handling of log fields for binary features, numerical features, and categorical features, according to at least one embodiment.

FIG. 19 illustrates feature handling 1900 of log fields for binary features, numerical features, and categorical features, according to at least one embodiment. A pipeline can extract various types of features, including binary features 1902, numerical features 1904, and categorical features 1906. The pipeline can convert the binary features 1902, numerical features 1904, and categorical features 1906 into respective log fields. As illustrated in FIG. 19, the binary features 1902 and numerical features 1904 can be converted to a value between 0 and 1. The categorical features 1906 can be converted to a set of numbers, referred to as an embedding.

Figure 20:
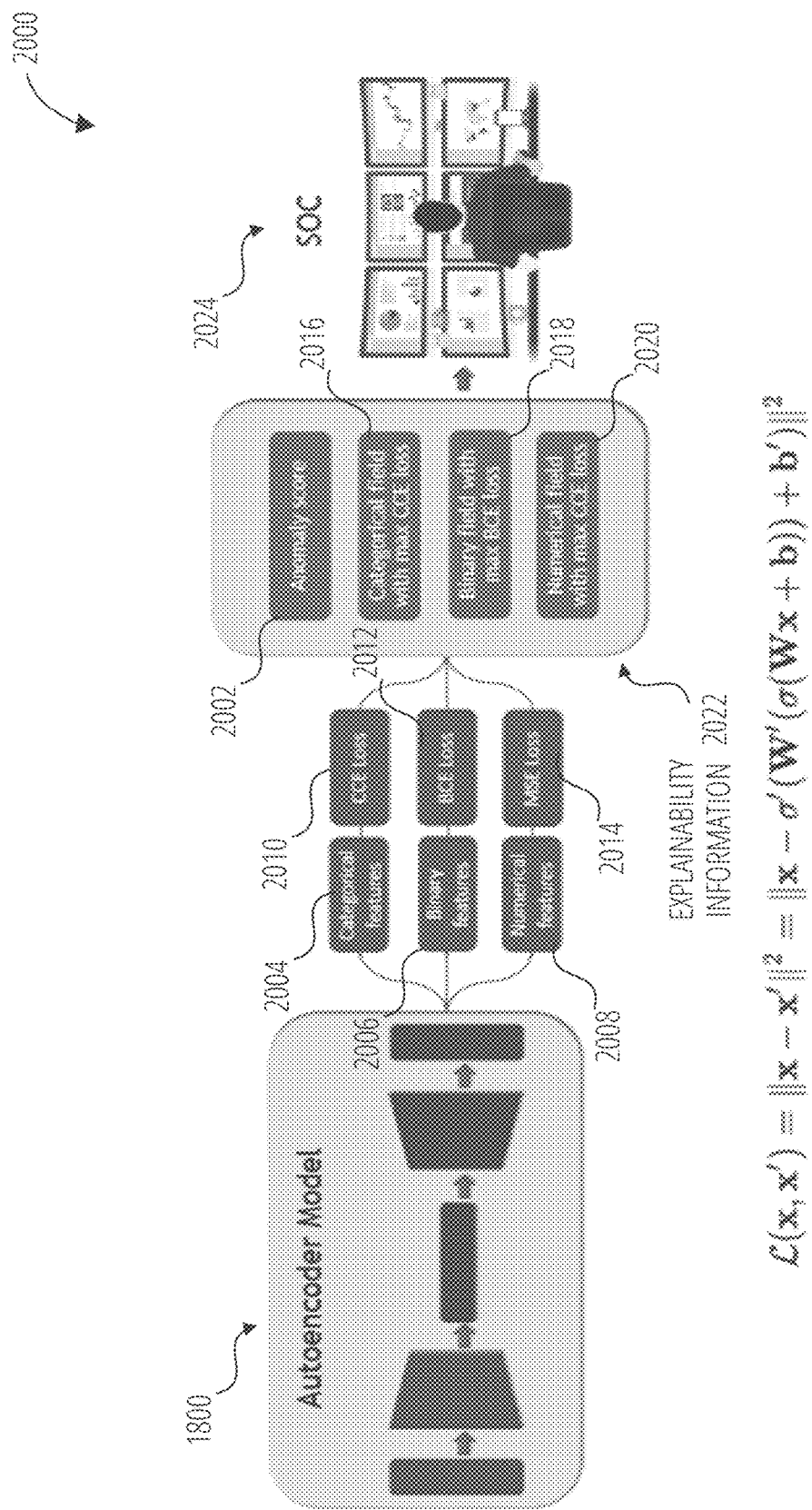
FIG. 20 illustrates a general flow of generating an anomaly score and explainability information from an autoencoder model according to at least one embodiment.

FIG. 20 illustrates a general flow 2000 of generating an anomaly score and explainability information 2022 from an autoencoder model 1800 according to at least one embodiment. In the flow 2000, the autoencoder model 1800 can output a reconstruction loss corresponding to an anomaly score 2002, as described above. The autoencoder model 1800 can also output the categorical feature(s) 2004, binary feature(s) 2006, and numerical feature(s) 2008. The DFP inference pipeline can determine a categorical cross-entropy (CCE) loss 2010 associated with the categorical feature(s) 2004. The DFP inference pipeline can determine a binary cross-entropy (BCE) loss 2012 associated with the binary feature(s) 2006. The DFP inference pipeline can determine a mean squared error (MSE) loss 2014 associated with the numerical feature(s) 2008. The DFP inference pipeline can output results, including an anomaly score 2002 and explainability information 2022 to be used for generating GUI dashboard(s) 2024 for evaluations by a human (e.g., security administrator). The explainability information 2022 can include a categorical field with a maximum CCE loss, a binary field with a maximum BCE loss, and a numerical field with a maximum MSE loss.

As described above, the reconstruction losses that contribute to the anomaly score 2002 can be separately output to enrich the anomaly score 2002. By surfacing what exact feature(s) resulted in the largest loss values, an analyst can zero in on what exactly caused this anti-pattern behavior as well as what trailheads are useful to investigate further.

Figure 21:
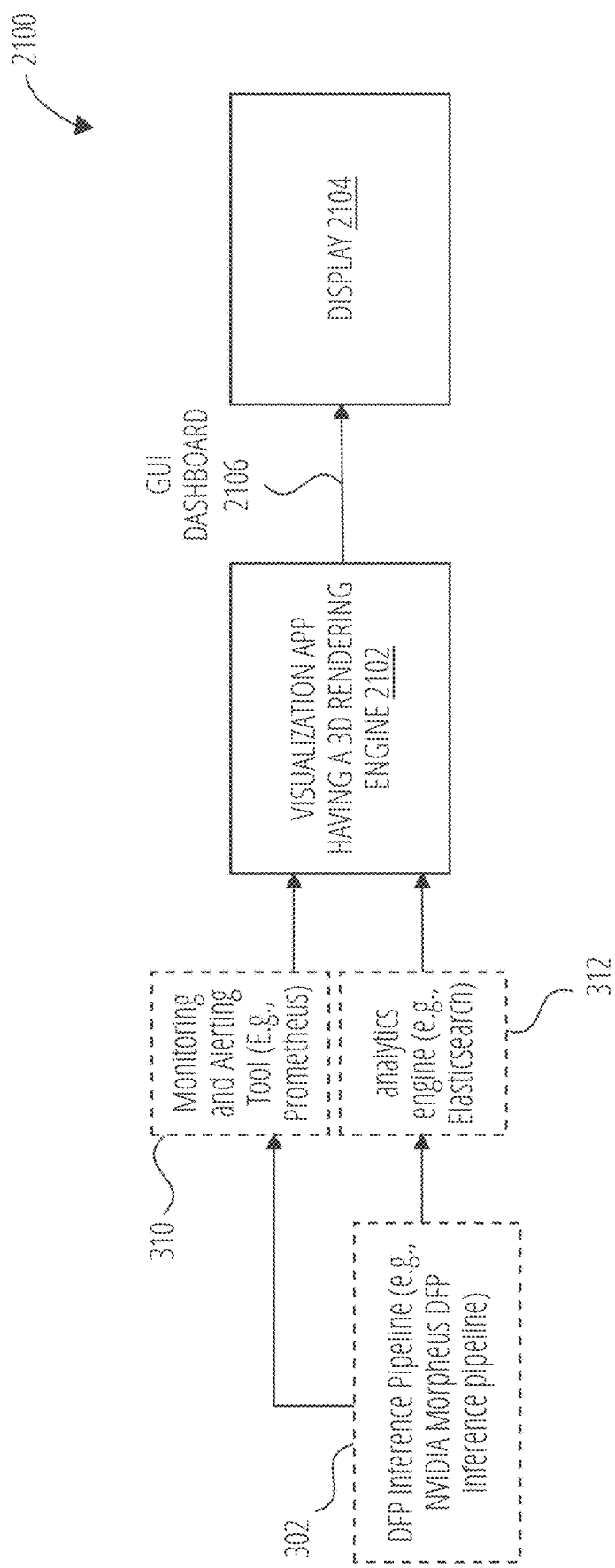
FIG. 21 is a block diagram of a data visualization and monitoring tool 2100 according to at least one embodiment.

FIG. 21 is a block diagram of a data visualization and monitoring tool 2100 according to at least one embodiment. The data visualization and monitoring tool 2100 can be implemented on a computing system with one or more memory devices to store instructions of a visualization app having a three-dimensional (3D) rendering engine 2102 and one or more processing devices, operatively coupled to the memory device(s), to execute the instructions of the visualization app having a 3D rendering engine 2102 to perform various operations as described below. The visualization app having a 3D rendering engine 2102 can access a dataset, including a set of records. The set of records can be historical records or real-time records. Each record represents a network access event by one of a set of network addresses and includes a network address identifier, a timestamp, and an anomaly score associated with the network access event. The dataset can be stored in an object bucket (e.g., S3 bucket) as described herein. The dataset can be stored by the DFP inference pipeline 302, the analytics engine 312, and/or monitoring and alerting tool 310, as described herein. That is, the analytics engine 312 can determine anomaly statistics.

The visualization app having a 3D rendering engine 2102 can determine, for each of the set of network addresses, an anomaly statistic using the set of records. The visualization app having a 3D rendering engine 2102 can identify and sort a subset of network address or user account identifiers (herein used interchangeably) according to the anomaly statistic, the subset of network address identifiers having higher anomaly statistics than other network address identifiers, and the subset having a maximum number of network address identifiers (e.g., dynamic maximum). The visualization app having a 3D rendering engine 2102 can generate gridded data set (e.g., 3D grid) of unit cells grouped or organized by the subset of network address identifiers as rows, time intervals as columns (i.e., a unit of time), colors as a configurable anomaly score summary value, and a binned number of network access events as column height values, based on a minimum to maximum height range. Each unit cell is a colored, 3D visual object that represents a composite score of the anomaly scores associated with zero or more network access events corresponding to the respective network address identifier at the respective time interval. The visualization app having a 3D rendering engine 2102 can generate a GUI dashboard 2106 with the gridded data set. The GUI dashboard 2106 can be a real-time GUI dashboard used to find anomalous patterns in real-time network access events. In another embodiment, the GUI dashboard 2106 can be used as a research tool for finding patterns in historical anomalous behaviors.

The visualization app having a 3D rendering engine 2102 causes the GUI dashboard 2106 to be rendered on a display 2104. An example of the GUI dashboard 2106 is illustrated in FIG. 22A, FIG. 22B, and FIG. 22C.

Figure 22A:
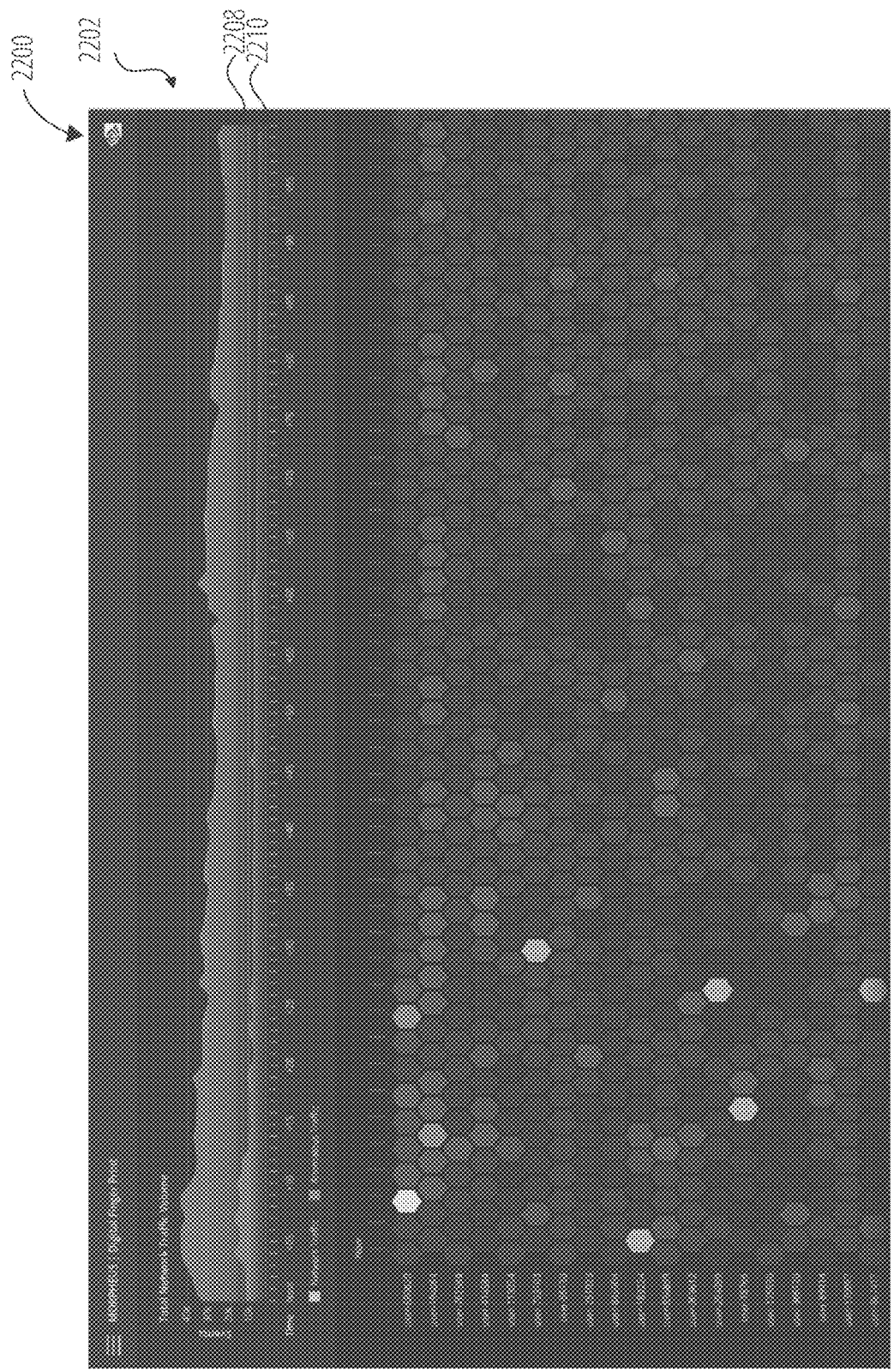
FIG. 22A illustrates a GUI dashboard with gridded data set according to at least one embodiment.
Figure 22B:
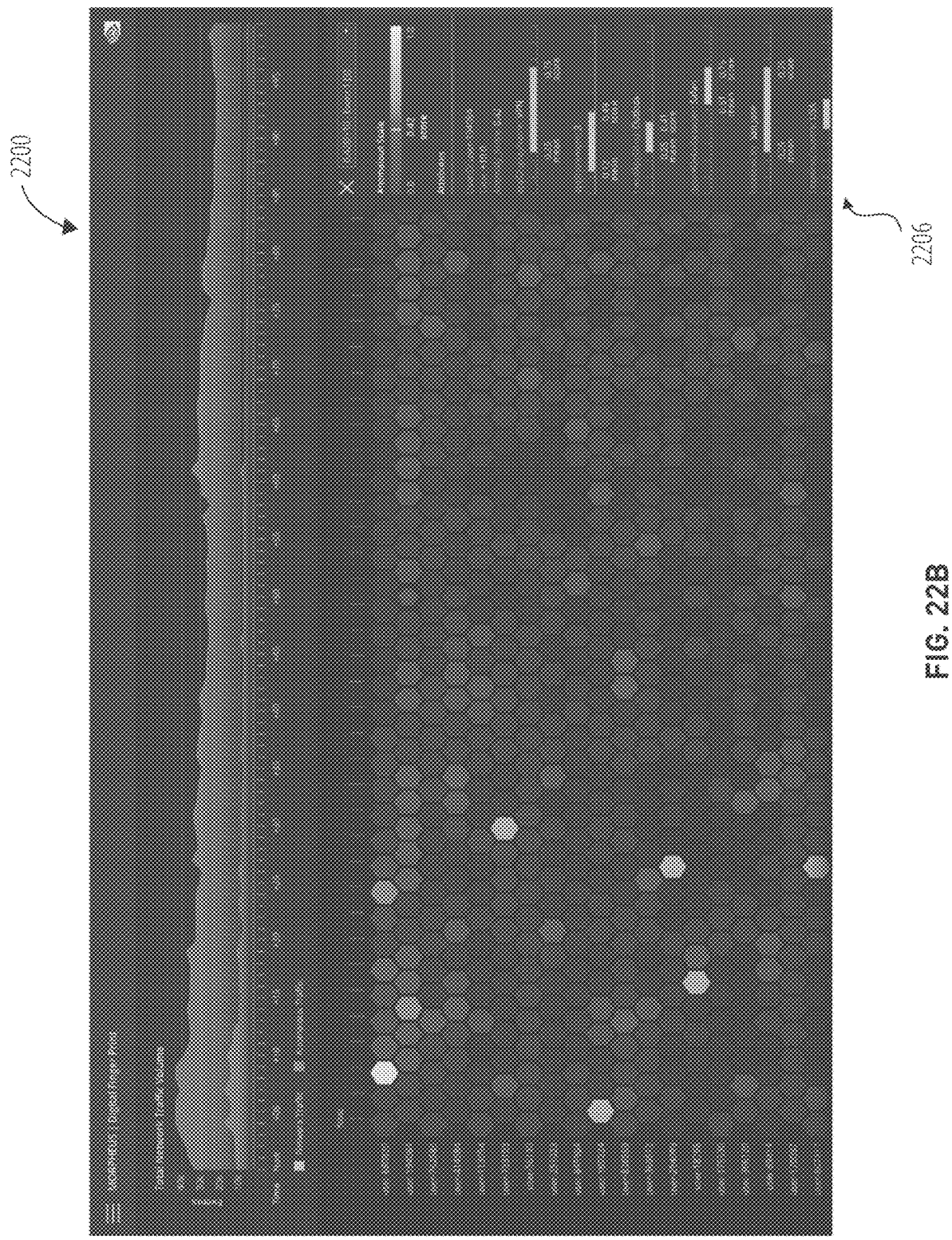
FIG. 22B illustrates the GUI dashboard with a dropdown menu according to at least one embodiment.
Figure 22C:
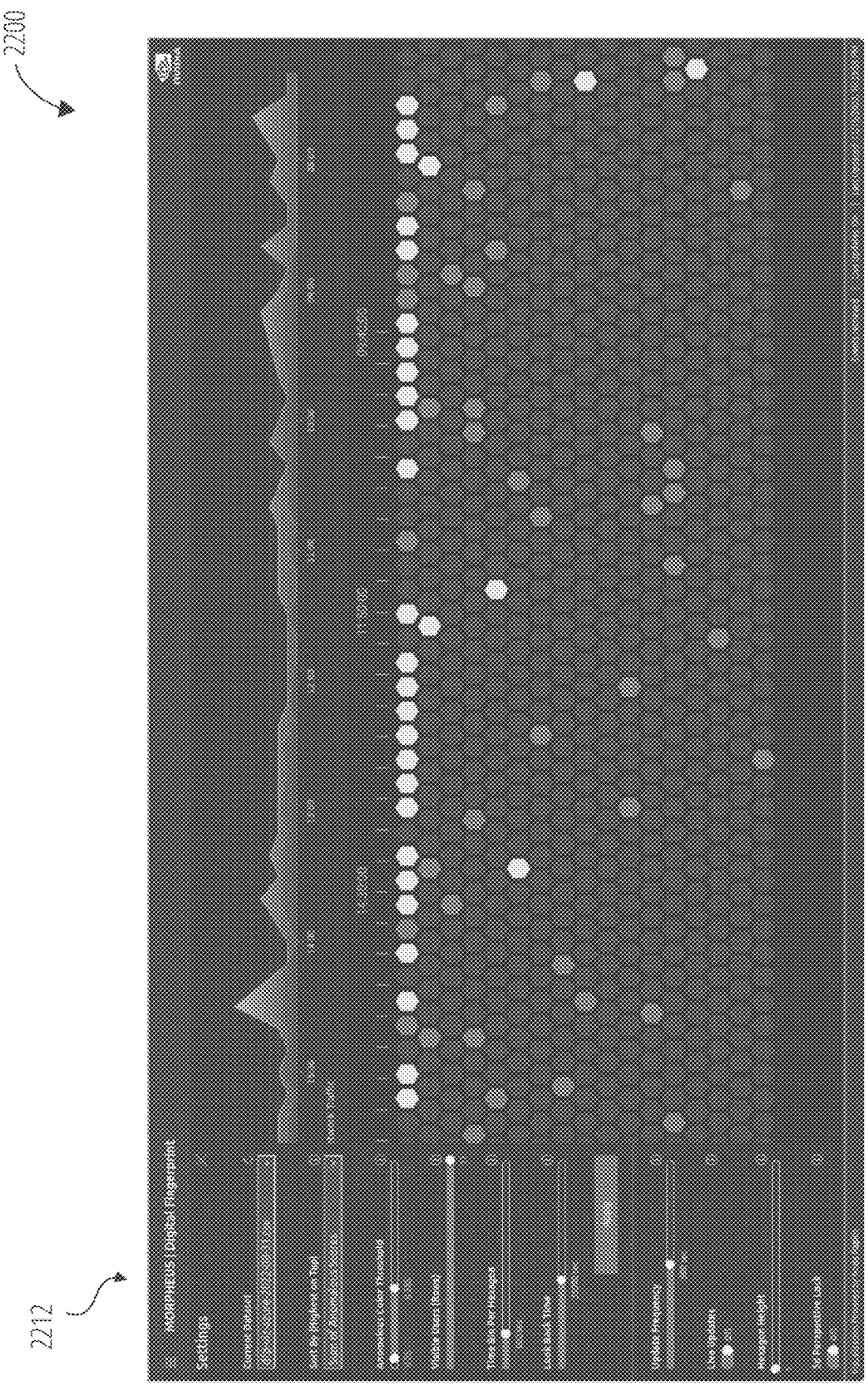
FIG. 22C illustrates the GUI dashboard 2200 with a settings menu according to at least one embodiment.

FIG. 22A illustrates a GUI dashboard 2200 with gridded data set 2204 according to at least one embodiment. The GUI dashboard 2200 includes an area chart 2202 showing the total network traffic volume. An area chart, also known as an area graph, is a type of data visualization used to display the magnitude or proportion of different data series over time or along a continuous axis. It is commonly used to illustrate the cumulative effect or trend of multiple variables. In particular, the area chart 2202 can include a total number of account access events 2208 and a total number of anomalous events 2210 as a function of time. A user of the GUI dashboard 2200 can move to different portions of the area chart 2202 and change the scale of the area chart 2202 by zooming in and out of different sections of the area chart 2202. The data visualization and monitoring tool 2100 can determine, for each time interval, the total number of network access events 2208 and the total number of anomalous events 2210, each anomalous event having at least a minimum anomaly score. The visualization app having a 3D rendering engine 2102 can generate the area chart 2202 (or other data visualization representation) to display a magnitude or proportion of the total number of anomalous events 2210 for each time interval. The area chart 2202 can represent the full view of the loaded dataset. The larger area represents total network traffic by event count. The other area represents anomalous events, as set by the lower bound of the anomalous color threshold in a settings menu.

The GUI dashboard 2200 includes the gridded data set 2204 to show unit cells that have been grouped or organized into a limited number of rows. The unit cell is illustrated as a hexagon shape, but other shapes can be used. As described above, the visualization app having a 3D rendering engine 2102 can determine, for each of the set of network addresses, an anomaly statistic using the set of records. The visualization app having a 3D rendering engine 2102 can identify and sort a subset of network address identifiers according to the anomaly statistic, the subset of network address identifiers having higher anomaly statistics than other network address identifiers, and the subset having a maximum number of network address identifiers. As illustrated in FIG. 22A, the gridded data set 2204 includes nineteen rows corresponding to nineteen different network addresses (e.g., user accounts). The unit cells can be sorted according to the anomaly statistic described above. The gridded data set 2204 of unit cells are grouped or organized by the subset of network address identifiers as the nineteen rows, time intervals as columns, colors as a configurable anomaly score indicator, and a number of network access events as column heights. Although FIG. 22A shows the unit cell as a hexagon, the user can tilt the gridded data set 2204, and the unit cell will be shown as a cylinder with a hexagon shape with a column height corresponding to the number of network access events. As described above, each unit cell is a colored, 3D visual object that represents a composite score of the anomaly scores associated with zero or more network access events corresponding to the respective network address identifier at the respective time interval.

In some embodiments, the area chart 2202 and the gridded data set 2204 can be separate objects that are not functionally tied together. That is, when the user manipulates a view of the gridded data set 2204, the area chart 2202 is not manipulated as well. In other embodiments, the area chart 2202 and the gridded data set 2204 can be functionally tied together so that when the view of one is modified, the other shows a corresponding view. For example, if the user modifies the time scale, the corresponding time scale for the other will be updated accordingly.

In at least one embodiment, as illustrated in FIG. 22A-C, the 3D visual objects are rendered as a hexagon grid. The hexagon grid represents network events, with anomalous events binned, colored, and sorted by row and time. The grid view can be reformatted in the settings menu. The most recent time stamp starts on the left. It should be noted that the hexagon grid and area chart axis are not synced. The hex grid can be navigated by a left click and dragging the view. The mouse wheel can be used to zoom in and out of the grid view. A double click anywhere on the grid can be used to reset the view. The color of the hexagon can be based on the maximum anomalous event if there are multiple events binned in the hexagon. Clicking on a hexagon can open the details menu 2206. If the menu is open, a click anywhere or the menu's X-button can close the menu. A selected hexagon can be designed with a black border or other indicators. Hexagons colored gray signify no recorded events. Using SHIFT+left click and dragging can be used to tilt into a 3D view of the hexagons, with the height representing the number of events. To reset the view back into 2D, a double click anywhere on the grid can be used. It should be noted that it is possible to right-click and drag to tilt into a 3D view.

It should be noted that heatmaps are typically displayed as a grid or a matrix of cells, where each cell corresponds to a specific data point or location within the dataset being analyzed. The number or value associated with each data point determines the color intensity of the corresponding cell. Not only does the GUI dashboard 2200 utilize aspects of a heatmap it can provide easy manipulation of the unit cells and the corresponding information associated with the unit cells as described herein. For example, in some embodiments, a user can select one of the unit cells to obtain additional information about the events, as illustrated in FIG. 22B.

FIG. 22B illustrates the GUI dashboard 2200 with a menu 2206 according to at least one embodiment. The visualization app having a 3D rendering engine 2102 can receive user input identifying a selected visual object in the gridded data set. The visualization app having a 3D rendering engine 2102 can generate the menu 2206 with dataset selection and event details of each of the zero or more network access events of the selected visual object. The event details can include an anomalous scale with a scaled anomaly score, the anomaly score in a color legend, one or more attributes scores contributing to the scaled anomaly score or the anomaly score, a scaled mean score based on a minimum value, and a maximum value of the anomaly scores of the dataset, or the like.

In at least one embodiment, the GUI dashboard 2200 can be generated based on records stored in one or more files (e.g., .env file(s)). The file can contain default values for individual event attributes for the data sources (e.g., Azure and Duo), which if present in this file, can be used to scale the attribute values for each event. If a value for a particular attribute is not found in the file, the minimum and maximum values of the current dataset in memory can be used to scale the individual event selected. Although GUI dashboard 2200 shows the menu 2206, in other embodiments, the information can be displayed in other ways. In at least one embodiment, each record can include one or more attributes and/or one or more attribute scores associated with the network access event. The one or more attribute scores can contribute to the anomaly score of the respective record. The following table illustrates an example dataset.

| | | Sample dataset | | | | |
|---|---|---|---|---|---|---|
| user | time | attr1_score | attr2_score | attr3_score | attr4_score | anomalyScore |
| test@domain.com | 2022-08-31T04:41:40.618981Z | 0.409575 | 0.398279 | 0.342628 | 1.05942 | 0.421076 |

In at least one embodiment, the menu in 2206 can show a dropdown list of the anomalous events binned within a unit cell (within a hexagon), ordered from most anomalous to least. It should be noted that the number of events can vary depending on "Time Bin Per Hexagon" values set in default settings or a settings menu 2212 (illustrated in FIG. 22C). In at least one embodiment, the anomalous scale can be a hexagon color legend for scaled anomaly scores between 0 and 1. The anomalous scale does not re-scale the score, just the range, and threshold of the color palette being used. The menu 2206 can also show an attributes list that includes the overall scaled anomaly score, on which the unit cells' colors are based, and its unscaled raw score. The menu 2206 can also show the individual contributing attributes scaled score and raw score. The scaled mean score can be calculated based on the values of the loaded dataset. A larger difference between the mean and attribute anomaly scores can be an indicator contributing to an event's overall anomaly score.

FIG. 22C illustrates the GUI dashboard 2200 with a settings menu 2212 according to at least one embodiment. In at least one embodiment, the settings menu 2212 can be used to alter the behavior and views of the GUI dashboard 2200. It should be noted that settings above the break line can be applied by clicking the apply button and are based on configurable defaults. Those below the break line can update in real time. The settings menu 2212 can be opened by clicking the menu icon in the upper left side of the GUI dashboard 2200; clicking the X-button can close the settings menu 2212. The "Current Dataset" drop down menu shows the currently selected dataset located in the data directory specified by the .env file. Clicking the reload icon can update the drop down if new files have been added. The "Sort By" drop down menu can show the different ways to order the user accounts, based on the anomalous events. The "Anomalous Color Threshold" range slider can set at what anomaly score the hexagons are colored, and the range between what is considered slightly anomalous to critical, as well as updating the color legend in menu 2206. The "Visible Users (Rows)" slider can set how many hexagon rows to show from top to bottom, based on the currently selected sort option. The max can be automatically set based on the number of unique user accounts in the dataset if no limit is set in the .env file. If the hexagon interaction performance is slow, decreasing the visible number of rows can help. The "Time Bin Per Hexagon" slider sets how many seconds of time each hexagon represents. A larger value will show less columns of hexagons and have more events per hexagon (i.e., binned), while a smaller value will show more hexagons. If the hexagon interaction performance is slow, increasing the time bin can help. The "Look Back Time" represents the amount of time shown in seconds, starting from the most recent time in the dataset. The maximum value can be based on the full time range of the dataset. Setting the "Look Back Time" to anything less than the maximum can generate a status warning noting that the full dataset has not been visualized. If the hexagon interaction performance is slow, decreasing the look back time can help. The "Update Frequency" represents the time in seconds between checking for a newer dataset file in the data directory. If a new file is present, the app can automatically load that file and visualize it. It should be noted that the 'newness' of the dataset can be based on the preconfigured timestamp based name of the file. The "Live Updates" toggles if the app automatically updates the loaded dataset based on the update frequency setting. It should be noted that if a user has selected an older dataset file and live updates is on, the latest dataset can load even if they are still interacting with the file. The "Hexagon Height" range slider can scale the heights of the hexagons when in a 3D view. The "3D Perspective Lock" toggles if the user can rotate and pan while in a 3D view.

In at least one embodiment, the visualization app having a 3D rendering engine 2102 can receive user input specifying a pan, a zoom-in, or zoom-out operation. The visualization app having a 3D rendering engine 2102 causes the gridded data set 2204, rendered on the display 2104, to pan, zoom in, or zoom out in the GUI dashboard 2200 in response to the user input. In at least one embodiment, the visualization app having a 3D rendering engine 2102 can receive user input specifying a tilt operation. The visualization app having a 3D rendering engine 2102 can cause a view of the gridded data set 2204, rendered on the display 2104, to tilt in the GUI dashboard 2200 in response to the user input. For example, the gridded data set 2204 can transition from a 2D view of the unit cells to a 3D view of the unit cells, as described herein. The 3D rendering engine facilitates the computations needed to display the unit cells in a 3D manner.

Figure 23:
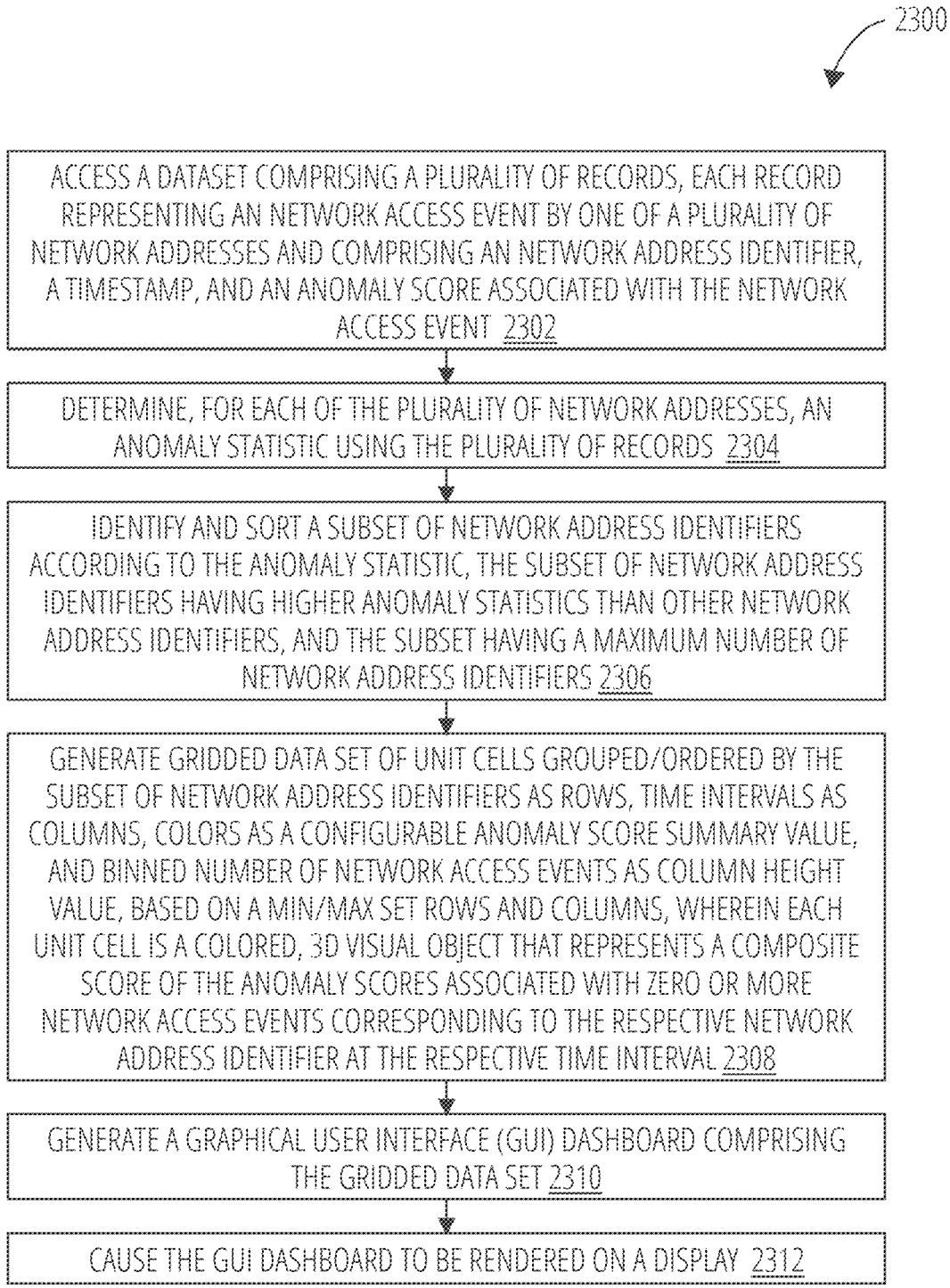
FIG. 23 is a flow diagram of a method for generating a GUI dashboard of anomaly scores of network access events in an enterprise according to at least one embodiment.

FIG. 23 is a flow diagram of a method 2300 for generating a GUI dashboard of anomaly scores of network access events in an enterprise according to at least one embodiment. The method 2300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 2300 is performed by the DFP system 100 of FIG. 1. In one embodiment, some portions of the method 2300 are performed by the DFP training pipeline architecture 200 of FIG. 2 and other portions are performed by the DFP inference pipeline architecture 300 of FIG. 3. In one embodiment, some portions of the method 2300 are performed by the DFP training pipeline 500 of FIG. 5 and other portions are performed by DFP inference pipeline 600 of FIG. 6. In one embodiment, some portions of the method 1600 are performed by the DFP training pipeline architecture 800 of FIG. 8 and other portions are performed by the DFP inference pipeline architecture 900 of FIG. 9. In one embodiment, some portions of the method 1600 are performed by the production DFP training pipeline 1000 of FIG. 10 and other portions are performed by the production DFP inference pipeline 1100 of FIG. 11. In one embodiment, the method 1600 is performed by the DFP system 1200 of FIG. 12, the DFP system 1300 of FIG. 13, the DFP system 1400 of FIG. 14, or the DFP system 1500 of FIG. 15.

Referring to FIG. 23, the method 2300 begins with the processing logic accessing a dataset comprising a set of records (block 2302). Each record represents a network access event by one of a set of network addresses and includes a network address identifier, a timestamp, and an anomaly score associated with the network access event. At block 2304, the processing logic determines, for each of the set of network addresses, an anomaly statistic using the set of records. At block 2306, the processing logic identifies and sorts a subset of network address identifiers according to the anomaly statistic, the subset of network address identifiers having higher anomaly statistics than other network address identifiers, and the subset having a maximum number of network address identifiers. At block 2308, the processing logic generates gridded data set of unit cells grouped/ordered by the subset of network address identifies as rows, time intervals as columns, colors as a configurable anomaly score summary value (also referred to as configurable anomaly score indicator), and a binned number of network access events as column height value, based on a minimum/maximum set rows and columns. Each unit cell is a colored, 3D visual object that represents a composite score of the anomaly scores associated with zero or more network access events corresponding to the respective network address identifier at the respective time interval. At block 2310, the processing logic generates a GUI dashboard, including the gridded data set. At block 2312, the processing logic causes the GUI dashboard to be rendered on a display.

In a further embodiment, the processing logic identifies a set of default settings, including multiple parameters. A first parameter can specify the maximum number of network address identifiers (or rows) to display in the gridded data set. A second parameter can specify an amount of time captured by each time interval or unit cell. A third parameter can specify the maximum number of intervals or unit cells to show. A fourth parameter can specify a range for an anomalous color scale that varies in color, intensity, or both based on the composite score to visually represent different levels of anomalous patterns in the set of records. A fifth parameter can specify the anomaly statistic for sorting the network address identifiers. A sixth parameter can specify an amount of time that is less than a full time of the data set. A seventh parameter can specify an update frequency representing an amount of time between checking for a newer dataset or an updated dataset.

In at least one embodiment, the processing logic can receive user input to modify at least one of the first parameter, the second parameter, the third parameter, the fourth parameter, or the fifth parameter. The processing logic can repeat the operations at blocks 2304, 2306, and 2308 after receiving the user input.

In at least one embodiment, the processing logic can receive user input identifying a selected visual object in the gridded data set. The processing logic can generate a menu (e.g., dropdown menu) including dataset selection and event details of each of the zero or more network access events of the selected visual object. The event details can include at least one of: an anomalous scale with a scaled anomaly score or the anomaly score in a color legend; one or more attributes scores contributing to the scaled anomaly score or the anomaly score; or a scaled mean score based on a minimum value and a maximum value of the anomaly scores of the dataset.

In at least one embodiment, the network addresses are sorted at block 2306 according to a mean of the anomaly scores for each of the set of network addresses or a total number of network access events satisfying a minimum anomaly score. Alternatively, the network addresses can be sorted based on other anomaly statistics.

In at least one embodiment, the processing logic generates a gridded data set of unit cells organized by a subset of account identifiers as rows, time intervals as columns, and a binned number of account access events as column height values, based on a minimum/maximum set of rows and columns. Each unit cell is a 3D visual object that visually represents a composite score of the anomaly scores associated with zero or more account access events corresponding to the respective account identifier at the respective time interval. The account identifiers of the subset have higher anomaly statistics than other account identifiers. The processing logic generates a GUI dashboard having the gridded data set and causes the GUI dashboard to be rendered on a display. The display can be part of the same computing system or can be a display of a remote computing device that is different from the computing system executing the visualization app having a 3D rendering engine.

The techniques disclosed herein may be incorporated in any processor that may be used for processing a neural network, such as, for example, a central processing unit (CPU), a GPU, an intelligence processing unit (IPU), a neural processing unit (NPU), a tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile devices, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Other variations are within the spirit of the present disclosure. Thus, while disclosed techniques are susceptible to various modifications and alternative constructions, certain illustrated embodiments are shown in drawings and described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if something is intervening. Recitation of ranges of values herein is merely intended to serve as a shorthand method of referring individually to each separate value falling within the range unless otherwise indicated herein. Each separate value is incorporated into the specification as if it were individually recited herein. In at least one embodiment, the use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two but can be more when indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code, while multiple non-transitory computer-readable storage media collectively store all of the code. In at least one embodiment, executable instructions are executed such that different instructions are executed by different processors—for example, a non-transitory computer-readable storage medium stores instructions, and a main central processing unit ("CPU") executes some of the instructions while a graphics processing unit ("GPU") and/or a data processing unit ("DPU")—potentially in conjunction with a GPU—executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure, and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or a similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as a system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an interprocess communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A computing system comprising:
one or more memory devices to store instructions; and
one or more processing devices operatively coupled to the one or more memory devices, the one or more processing devices to execute the instructions to perform operations comprising:
accessing a dataset comprising a plurality of records, each record representing a network access event by one of a plurality of network addresses and comprising a network address identifier, a timestamp, and an anomaly score associated with the network access event;
determining, for each of the plurality of network addresses, an anomaly statistic using the plurality of records;
identifying and sorting a subset of network address identifiers according to the anomaly statistic, the subset of network address identifiers having higher anomaly statistics than other network address identifiers, and the subset of network address identifiers having a maximum number of network address identifiers;
generating gridded data set of unit cells organized by the subset of network address identifiers as rows, time intervals as columns, colors as a configurable anomaly score indicator, and a binned number of network access events as column height values, based on a maximum or minimum set of rows and columns, wherein each unit cell is a colored, 3D visual object that represents a composite score of anomaly scores associated with zero or more network access events corresponding to the respective network address identifier at the respective time interval;
generating a graphical user interface (GUI) dashboard comprising the gridded data set; and
causing the GUI dashboard to be rendered on a display.

2. The computing system of claim 1, wherein the operations further comprise:
identifying a set of default settings, the set of default settings comprising:
a first parameter specifying the maximum number of network address identifiers to display in the gridded data set;
a second parameter specifying an amount of time captured by each time interval or unit cell;
a third parameter specifying the maximum number of intervals or unit cells to show;
a fourth parameter specifying a range for an anomalous color scale that varies in color, intensity, or both based on the composite score to visually represent different levels of anomalous patterns in the plurality of records; and a fifth parameter specifying the anomaly statistic for sorting the network address identifiers;

receiving user input to modify at least one of the first parameter, the second parameter, the third parameter, the fourth parameter, or the fifth parameter; and repeating the determining, the identifying and sorting, and the generating the gridded data set after receiving the user input.

3. The computing system of claim 1, wherein the operations further comprise:

receiving user input identifying a selected visual object in the gridded data set;

generating a menu comprising dataset selection and event details of each of the zero or more network access events of the selected visual object, wherein the event details comprise at least one of: an anomalous scale with a scaled anomaly score or the anomaly score in a color legend; one or more attributes scores contributing to the scaled anomaly score or the anomaly score; or a scaled mean score based on a minimum value and a maximum value of the anomaly scores of the dataset.

4. The computing system of claim 1, wherein the network addresses are sorted by the anomaly statistic, wherein the anomaly statistic is a mean of the anomaly scores for each of the plurality of network addresses or a total number of network access events satisfying a minimum anomaly score.

5. The computing system of claim 2, wherein the set of default settings further comprises a sixth parameter specifying an amount of time that is less than a full time of the gridded data set.

6. The computing system of claim 2, wherein the set of default settings further comprises a seventh parameter specifying an update frequency representing an amount of time between checking for a newer dataset or an updated dataset.

7. The computing system of claim 1, wherein the operations further comprise:

determining, for each time interval, a total number of network access events and a total number of anomalous events, each anomalous event having at least a minimum anomaly score; and generating an area chart to display a magnitude or proportion of the total number and the number for each time interval, wherein the GUI dashboard comprises the area chart.

8. The computing system of claim 1, wherein the GUI dashboard is a real-time GUI dashboard to find anomalous patterns in the network access events in real-time.

9. The computing system of claim 1, wherein the plurality of records are historical records.

10. The computing system of claim 1, wherein each record further comprises one or more attribute scores associated with the network access event, wherein the one or more attribute scores contribute to the anomaly score of the respective record.

11. The computing system of claim 1, wherein the operations further comprise:

receiving user input specifying a pan, a zoom-in, or zoom-out operation; and causing the gridded data set, rendered on the display, to pan, zoom in, or zoom out in the GUI dashboard in response to the user input.

12. The computing system of claim 1, wherein the operations further comprise:

receiving user input specifying a tilt operation; and causing a view of the gridded data set, rendered on the display, to tilt in the GUI dashboard in response to the user input.

13. A method comprising:

accessing a dataset comprising a plurality of records, each record representing a network access event by one of a plurality of network addresses and comprising a network address identifier, a timestamp, and an anomaly score associated with the network access event;

determining, for each of the plurality of network addresses, an anomaly statistic using the plurality of records;

identifying and sorting a subset of network address identifiers according to the anomaly statistic, the subset of network address identifiers having higher anomaly statistics than other network address identifiers, and the subset of network address identifiers having a maximum number of network address identifiers;

generating a three-dimensional (3D) grid of unit cells organized by the subset of network address identifiers as rows, time intervals as columns, colors as a configurable anomaly score indicator, and a number of network access events as column heights, wherein each unit cell is a colored, 3D visual object that represents a composite score of anomaly scores associated with zero or more network access events corresponding to the respective network address identifier at the respective time interval;

generating a graphical user interface (GUI) dashboard comprising the 3D grid of unit cells; and causing the GUI dashboard to be rendered on a display.

14. The method of claim 13, further comprising:

identifying a set of default settings, the set of default settings comprising:

a first parameter specifying the maximum number of network address identifiers to display in the 3D grid of unit cells;

a second parameter specifying an amount of time captured by each time interval or unit cell;

a third parameter specifying the maximum number of intervals or unit cells to show;

a fourth parameter specifying a range for an anomalous color scale that varies in color, intensity, or both based on the composite score to visually represent different levels of anomalous patterns in the plurality of records; and a fifth parameter specifying the anomaly statistic for sorting the network address identifiers;

receiving user input to modify at least one of the first parameter, the second parameter, the third parameter, the fourth parameter, or the fifth parameter; and repeating the determining, the identifying and sorting, and the generating the 3D grid of unit cells after receiving the user input.

15. The method of claim 13, further comprising:

receiving user input identifying a selected visual object in the 3D grid of unit cells;

generating a menu comprising dataset selection and event details of each of the zero or more network access events of the selected visual object, wherein the event details comprise at least one of: an anomalous scale with a scaled anomaly score or the anomaly score in a color legend; one or more attributes scores contributing to the scaled anomaly score or the anomaly score; or a scaled mean score based on a minimum value and a maximum value of the anomaly scores of the dataset.

16. The method of claim 13, wherein identifying and sorting comprises sorting the network addresses based on a mean of the anomaly scores for each of the plurality of network addresses or a total number of network access events satisfying a minimum anomaly score.

17. The method of claim 14, wherein the set of default settings further comprises a sixth parameter specifying an amount of time that is less than a full time of the 3D grid of unit cells.

18. A computing system comprising:
a memory device; and
a processing device operatively coupled to the memory device, the processing device to:
access a dataset comprising a plurality of records, each record representing a network access event by one of a plurality of network addresses and comprising a network address identifier, a timestamp, and an anomaly score associated with the network access event;
determine, for each of the plurality of network addresses, an anomaly statistic using the plurality of records;
identify and sort a subset of network address identifiers according to the anomaly statistic, the subset of network address identifiers having higher anomaly statistics than other network address identifiers, and the subset of network address identifiers having a maximum number of network address identifiers;
generate a three-dimensional (3D) grid of unit cells organized by the subset of network address identifiers as rows, time intervals as columns, colors as a configurable anomaly score indicator, and a number of network access events as column heights, wherein each unit cell is a colored, 3D visual object that represents a composite score of the anomaly scores associated with zero or more network access events corresponding to the respective network address identifier at the respective time interval;
generate a graphical user interface (GUI) dashboard comprising the 3D grid of unit cells; and
cause the GUI dashboard to be rendered on a display.

19. The computing system of claim 18, wherein the processing device is further to:
identify a set of default settings, the set of default settings comprising:
a first parameter specifying the maximum number of network address identifiers to display in the 3D grid of unit cells;
a second parameter specifying an amount of time captured by each time interval or unit cell;
a third parameter specifying the maximum number of intervals or unit cells to show;
a fourth parameter specifying a range for an anomalous color scale that varies in color, intensity, or both based on the composite score to visually represent different levels of anomalous patterns in the plurality of records; and
a fifth parameter specifying the anomaly statistic for sorting the network address identifiers;
receive user input to modify at least one of the first parameter, the second parameter, the third parameter, the fourth parameter, or the fifth parameter; and
repeat the determining, the identifying and sorting, and the generating the 3D grid of unit cells after receiving the user input.

20. The computing system of claim 18, wherein the processing device is further to:

receive user input identifying a selected visual object in the 3D grid of unit cells;
generate a menu comprising dataset selection and event details of each of the zero or more network access events of the selected visual object, wherein the event details comprise at least one of: an anomalous scale with a scaled anomaly score or the anomaly score in a color legend; one or more attributes scores contributing to the scaled anomaly score or the anomaly score; or a scaled mean score based on a minimum value and a maximum value of the anomaly scores of the dataset.

21. A computing system comprising:
one or more memory devices to store instructions; and
one or more processing devices operatively coupled to the one or more memory devices, the one or more processing devices to execute the instructions to perform the following operations:
accessing a dataset comprising a plurality of records, each record representing a network access event by one of a plurality of network addresses and comprising a network address identifier, a timestamp, and an anomaly score associated with the network access event;
determining, for each of the plurality of network addresses, an anomaly statistic using the plurality of records;
identifying and sorting a subset of network address identifiers according to the anomaly statistic, the subset of network address identifiers having higher anomaly statistics than other network address identifiers, and the subset of network address identifiers having a maximum number of network address identifiers;
generating gridded data set of unit cells organized by the subset of network address identifiers and time intervals in a two-dimensional (2D) view of rows and columns, colors as a configurable anomaly score indicator, and a binned number of network access events as column height values for a three-dimensional (3D) view of the gridded data set of unit cells, based on a maximum or minimum set of rows and columns in the 2D view, wherein each unit cell is a colored, 3D visual object that represents a composite score of anomaly scores associated with zero or more network access events corresponding to the respective network address identifier at the respective time interval;
generating a graphical user interface (GUI) dashboard comprising the gridded data set; and
causing the GUI dashboard to be rendered on a display.

22. The computing system of claim 21, wherein the operations further comprise:
identifying a set of default settings, the set of default settings comprising:
a first parameter specifying the maximum number of network address identifiers to display in the gridded data set;
a second parameter specifying an amount of time captured by each time interval or unit cell;
a third parameter specifying the maximum number of intervals or unit cells to show;
a fourth parameter specifying a range for an anomalous color scale that varies in color, intensity, or both based on the composite score to visually represent different levels of anomalous patterns in the plurality of records; and a fifth parameter specifying the anomaly statistic for sorting the network address identifiers;

receiving user input to modify at least one of the first parameter, the second parameter, the third parameter, the fourth parameter, or the fifth parameter; and repeating the determining, the identifying and sorting, and the generating the gridded data set after receiving the user input.

\* \* \* \* \*